US012631711B2

(12) United States Patent
Du et al.

(10) Patent No.: US 12,631,711 B2
(45) Date of Patent: May 19, 2026

(54) COMMUNICATION METHOD AND APPARATUS

(71) Applicant: HUAWEI TECHNOLOGIES CO., LTD., Shenzhen (CN)

(72) Inventors: Xianfeng Du, Chengdu (CN); Oupeng Li, Chengdu (CN); Jia He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 18/360,841

(22) Filed: Jul. 28, 2023

(65) Prior Publication Data

US 2023/0366972 A1      Nov. 16, 2023

Related U.S. Application Data

(63) Continuation of application No. PCT/CN2022/072227, filed on Jan. 17, 2022.

(30) Foreign Application Priority Data

Feb. 8, 2021      (CN) .......................... 202110183403.4

(51) Int. Cl.
*G01S 5/00*          (2006.01)
*G01S 5/02*          (2010.01)
(Continued)

(52) U.S. Cl.
CPC ........... *G01S 5/0226* (2013.01); *H04W 4/023* (2013.01); *H04W 4/38* (2018.02)

(58) Field of Classification Search
CPC ........ G01S 5/0236; H04W 4/38; H04W 4/023
See application file for complete search history.

(56) References Cited

U.S. PATENT DOCUMENTS

| 2021/0143879 A1* | 5/2021 | Ji .......................... H04B 7/0626 |
| 2022/0256519 A1* | 8/2022 | Jeon ...................... G01S 7/0235 |

FOREIGN PATENT DOCUMENTS

| CN | 107172592 A | 9/2017 |
| CN | 110611527 A | 12/2019 |
| WO | 2012037680 A1 | 3/2012 |

OTHER PUBLICATIONS

Mark Roberton et al, Integrated Radar and Communications based on Chirped Spread-Spectrum Techniques, IEEE MTT-S International Microwave Symposium digest, Jul. 2003, 4 pages.

* cited by examiner

*Primary Examiner* — Erika A Washington

(57) ABSTRACT

A communication method and apparatus are provided. The communication apparatus communicates with a device to obtain first information that includes location information and/or motion information of the device, and senses an environment to obtain environment sensing information that includes location information and/or motion information of an object in the environment. The communication apparatus determines a first antenna panel and/or a second antenna panel different from the first antenna panel based on the first information and the environment sensing information, where the first antenna panel is configured to communicate with a first device, and/or is configured to send, to the first device, a signal for sensing information, the second antenna panel is configured to receive sensing signal from the first device. In the communication apparatus, sensing and communication functions can be implemented in a single hardware system, thereby decreasing a size of the communication apparatus and reducing the cost.

17 Claims, 9 Drawing Sheets

(51)  Int. Cl.
     *H04W 4/02*        (2018.01)
     *H04W 4/38*        (2018.01)

Second antenna panel      First antenna panel

Second antenna panel      First antenna panel

COMMUNICATION METHOD AND APPARATUS

CROSS-REFERENCE TO RELATED APPLICATIONS

This application is a continuation of International Application No. PCT/CN2022/072227, filed on Jan. 17, 2022, which claims priority to Chinese Patent Application No. 202110183403.4, filed on Feb. 8, 2021. The disclosures of the aforementioned applications are hereby incorporated by reference in their entireties.

TECHNICAL FIELD

This application relates to the field of communication technologies, and in particular, to a communication method and apparatus.

BACKGROUND

Radar sensing is a wireless sensing technology. A radar transmits a signal to the outside. After the signal reaches a target object, an echo signal is formed. A location, a shape, a motion feature, a moving trajectory, or the like of the target object is determined by analyzing a feature of the received echo signal, so that a feature of the target object and a feature of a surrounding environment of the target object can be further deduced. In addition to sensing, radars or apparatuses with radar functions may need to communicate with other devices. Therefore, currently, two hardware systems are disposed in a radar system, including two radio frequency circuits, two antennas, and the like, which are separately used for sensing and communication.

When a radar needs to accommodate two hardware systems, a size of the radar is large, and costs of the radar are increased.

SUMMARY

Embodiments of this application provide a communication method and apparatus, to reduce a size of a radar and reduce costs of the radar.

According to a first aspect, a communication method is provided. The method may be performed by a communication apparatus. The communication apparatus is, for example, an independent device, or may be a functional module disposed in another device. The another device is, for example, a network device, a terminal device, or a radar. The communication apparatus includes K antenna panels, and each antenna panel in the K antenna panels can be used for communication and/or sensing. The communication apparatus determines that P antenna panels in the K antenna panels are used for communication, and determines that Q antenna panels in the K antenna panels are used for sensing, where both P and Q are positive integers less than or equal to N. The communication apparatus communicates with at least one device by using the P antenna panels. The communication apparatus senses the at least one device by using the Q antenna panels.

In embodiments of this application, some antenna panels (panel) of the communication apparatus may be used for communication, and some antenna panels may be used for sensing, so that a communication function and a sensing function are implemented by using different antenna panels, to reduce mutual interference between different functions during execution. In addition, there is no need to arrange two hardware systems in the communication apparatus, and only one hardware system is required to implement the sensing and communication functions. In this way, a size of the communication apparatus is reduced, and costs of the communication apparatus are reduced.

In an optional implementation, that the communication apparatus determines that P antenna panels in the K antenna panels are used for communication, and determines that Q antenna panels in the K antenna panels are used for sensing includes: The communication apparatus communicates with the at least one device to obtain at least one piece of first information of the at least one device, where one piece of first information in the at least one piece of first information includes location information and/or motion information of the device. The communication apparatus senses an environment to obtain environment sensing information, where the environment sensing information includes location information and/or motion information of an object in the environment. The communication apparatus determines, based on the at least one piece of first information and the environment sensing information, that the P antenna panels are used for communication and the Q antenna panels are used for sensing. The communication apparatus may determine, based on a sensed status of the environment and a detected status of the another device, antenna panels used for communication and antenna panels used for sensing, so that functions of the determined antenna panels better satisfy an actual requirement.

In an optional implementation, the P antenna panels can be used for sensing and communication. For example, if an antenna panel can send a signal for obtaining sensing information, or can receive sensing information from the another device or a target object in the environment, it indicates that the antenna panel can be used for sensing. If an antenna panel can receive and send a communication signal, it indicates that the antenna panel can be used for communication. In addition to receiving and sending a communication signal, the P antenna panels can further send the signal for obtaining sensing information. In this case, the P antenna panels can be used for both communication and sensing. An antenna panel used for communication is used to send the signal for obtaining sensing information, so that the signal for obtaining sensing information may be implemented by using a communication signal. A sensing signal is implemented by using a communication signal, and there is no need to additionally set a sensing signal. Therefore, signaling overheads can be reduced.

In an optional implementation, that the communication apparatus senses an environment to obtain environment sensing information includes: The communication apparatus sends a first signal to the target object in the environment by using a third antenna panel, where the first signal is used for sensing environmental information, the third antenna panel belongs to N antenna panels included in the communication apparatus, the N antenna panels are configured to send and/or receive a signal used for communication, and are configured to send the signal for obtaining sensing information, and N is a positive integer. The communication apparatus receives a second signal from the target object by using a fourth antenna panel, where the second signal is a reflected signal of the first signal, or the second signal is a signal generated based on the first signal, the fourth antenna panel belongs to M antenna panels included in the communication apparatus, the M antenna panels are configured to receive sensing information, and M is a positive integer. The communication apparatus performs, by using a processor, correlation processing based on the second signal, to obtain the environment sensing information.

In an optional implementation, that the communication apparatus determines, based on the at least one piece of first information and the environment sensing information, that the P antenna panels are used for communication and the Q antenna panels are used for sensing includes: The communication apparatus determines a first antenna panel and/or a second antenna panel based on the at least one piece of first information and the environment sensing information, where the first antenna panel is configured to communicate with a first device in the at least one device, and/or is configured to send, to the first device, the signal for obtaining sensing information, the second antenna panel is configured to receive sensing information from the first device, the first antenna panel is one of the P antenna panels, the second antenna panel is one of the Q antenna panels, and the first antenna panel and the second antenna panel are different antenna panels.

In an optional implementation, the method further includes: The communication apparatus determines a fifth antenna panel based on the at least one piece of first information and the environment sensing information, where the fifth antenna panel is configured to communicate with a second device in the at least one device, and/or is configured to send, to the second device, the signal for obtaining sensing information, and the fifth antenna panel is one of the P antenna panels. The first antenna panel and the fifth antenna panel satisfy one or more of the following relationships: a communication time of the first antenna panel is different from that of the fifth antenna panel; the first antenna panel and the fifth antenna panel use different communication frequencies; and a distance between the first antenna panel and the fifth antenna panel is greater than a third threshold.

In an optional implementation, that the communication apparatus determines a first antenna panel based on the at least one piece of first information and the environment sensing information includes: The communication apparatus determines, based on the first information of the first device, that a distance between the first device and the communication apparatus is less than or equal to a first threshold, and determines, based on the first information of the first device and the environment sensing information, that no obstacle exists between the first device and the communication apparatus. The communication apparatus determines, the first antenna panel, where a quantity of antenna panels included in the first antenna panel is less than or equal to a second threshold.

In an optional implementation, that the communication apparatus determines a first antenna panel based on the at least one piece of first information and the environment sensing information includes: The communication apparatus determines, based on the first information of the first device, that a distance between the first device and the communication apparatus is greater than a first threshold, and determines, based on the first information of the first device and the environment sensing information, that no obstacle exists between the first device and the communication apparatus. The communication apparatus determines the first antenna panel, where a quantity of antenna panels included in the first antenna panel is greater than a second threshold.

In an optional implementation, that the communication apparatus determines a second antenna panel based on the at least one piece of first information and the environment sensing information includes: The communication apparatus determines, based on the first information of the first device and the environment sensing information, that an obstacle exists between the first device and the communication apparatus. The communication apparatus determines the second antenna panel.

In an optional implementation, that the communication apparatus determines a first antenna panel based on the at least one piece of first information and the environment sensing information includes: The communication apparatus senses the first device by using the second antenna panel, to obtain updated first information of the first device. The communication apparatus determines, based on the updated first information of the first device and the environment sensing information, that no obstacle exists between the first device and the communication apparatus. The communication apparatus determines the first antenna panel.

In an optional implementation, the signal for obtaining sensing information is a synchronization signal.

For technical effects brought by the first aspect or some optional implementations, refer to following descriptions of the technical effects brought by the second aspect or the corresponding implementations.

According to a second aspect, a communication method is provided. The method may be performed by a communication apparatus. The communication apparatus is, for example, an independent device, or may be a functional module disposed in another device. The another device is, for example, a network device, a terminal device, or a radar. The communication apparatus communicates with at least one device to obtain at least one piece of first information of the at least one device, where one piece of first information in the at least one piece of first information includes location information and/or motion information of the device. The communication apparatus senses an environment to obtain environment sensing information, where the environment sensing information includes location information and/or motion information of an object in the environment. The communication apparatus determines a first antenna panel and/or a second antenna panel based on the at least one piece of first information and the environment sensing information, where the first antenna panel is configured to communicate with a first device in the at least one device, and/or is configured to send, to the first device, a signal for obtaining sensing information, the second antenna panel is configured to receive sensing information from the first device, and the first antenna panel and the second antenna panel are different antenna panels.

In embodiments of this application, some antenna panels of the communication apparatus may be used for communication, and some antenna panels may be used for sensing, so that a communication function and a sensing function are implemented by using different antenna panels, to reduce mutual interference between different functions during execution. In addition, there is no need to arrange two hardware systems in the communication apparatus, and only one hardware system is required to implement sensing and communication functions. In this way, a size of the communication apparatus is reduced, and costs of the communication apparatus are reduced.

In an optional implementation, that the communication apparatus senses an environment to obtain environment sensing information includes: The communication apparatus sends a first signal to a target object in the environment by using a third antenna panel, where the first signal is used for sensing environmental information, the third antenna panel belongs to N antenna panels included in the communication apparatus, the N antenna panels are configured to send and/or receive a signal used for communication, and are configured to send the signal for obtaining sensing information, and N is a positive integer. The communication apparatus receives a second signal from the target object by using a fourth antenna panel, where the second signal is a reflected signal of the first signal, or the second signal is a signal generated based on the first signal, the fourth antenna panel belongs to M antenna panels included in the communication apparatus, the M antenna panels are configured to receive sensing information, and M is a positive integer. The communication apparatus performs, by using a processor, correlation processing based on the second signal, to obtain the environment sensing information. The communication apparatus may perform correlation processing based on a received signal (for example, the second signal), to obtain sensing information. The sensing information represents, for example, a distance between the target object and the communication apparatus, or represents a location of the target object. In embodiments of this application, the communication apparatus may complete signal-correlation processing by using the processor, but does not perform signal-correlation processing by using a communication circuit. If the communication circuit performs signal-correlation processing, if a sent signal is a communication signal, a processing result may be inaccurate. However, in embodiments of this application, the processor performs signal-correlation processing, so that a problem caused when the processing is performed by the communication circuit is resolved. In this way, the communication apparatus in embodiments of this application can use a communication signal as a sensing signal, so that signaling overheads are reduced, and the communication apparatus in embodiments of this application can complete both the communication function and the sensing function, thereby implementing integration of communication and sensing.

In an optional implementation, the method further includes: The communication apparatus determines a fifth antenna panel based on the at least one piece of first information and the environment sensing information, where the fifth antenna panel is configured to communicate with a second device in the at least one device, and/or is configured to send, to the second device, the signal for obtaining sensing information, and the first antenna panel and the fifth antenna panel satisfy one or more of the following relationships: a communication time of the first antenna panel is different from that of the fifth antenna panel; the first antenna panel and the fifth antenna panel use different communication frequencies; and a distance between the first antenna panel and the fifth antenna panel is greater than a third threshold. The communication apparatus may separately allocate antenna panels to different devices. Optionally, processing may be performed from any one or more perspectives in time domain, frequency domain, or spatial domain, to reduce interference between antenna panels allocated to different devices, and improve communication quality.

In an optional implementation, that the communication apparatus determines a first antenna panel based on the at least one piece of first information and the environment sensing information includes: The communication apparatus determines, based on the first information of the first device, that a distance between the first device and the communication apparatus is less than or equal to a first threshold, and determines, based on the first information of the first device and the environment sensing information, that no obstacle exists between the first device and the communication apparatus. The communication apparatus determines, the first antenna panel, where a quantity of antenna panels included in the first antenna panel is less than or equal to a second threshold. If no obstacle exists between the communication apparatus and the first device and the distance between the communication apparatus and the first device is small, the communication apparatus can cover the first device by allocating a small quantity of antenna panels rather than allocating a large quantity of antenna panels. In this way, more antenna panels can be reserved for allocation to the another device, so that utilization of the antenna panels is improved.

In an optional implementation, that the communication apparatus determines a first antenna panel based on the at least one piece of first information and the environment sensing information includes: The communication apparatus determines, based on the first information of the first device, that a distance between the first device and the communication apparatus is greater than a first threshold, and determines, based on the first information of the first device and the environment sensing information, that no obstacle exists between the first device and the communication apparatus. The communication apparatus determines the first antenna panel, where a quantity of antenna panels included in the first antenna panel is greater than a second threshold. If no obstacle exists between the communication apparatus and the first device and the distance between the communication apparatus and the first device is large, the communication apparatus may allocate a large quantity of antenna panels to the first device, to implement coverage on the first device by using a narrow beam synthesized by the large quantity of antenna panels, so that coverage of the communication apparatus is improved.

In an optional implementation, that the communication apparatus determines a second antenna panel based on the at least one piece of first information and the environment sensing information includes: The communication apparatus determines, based on the first information of the first device and the environment sensing information, that an obstacle exists between the first device and the communication apparatus. The communication apparatus determines the second antenna panel. If an obstacle exists between the first device and the communication apparatus, the communication apparatus may allocate the second antenna panel to the first device to sense the first device or sense the obstacle, to determine existence of the obstacle. For example, the communication apparatus may continuously track the obstacle, to determine whether the obstacle continues to be present. Certainly, in this case, the communication apparatus may allocate the first antenna panel to the first device. In this case, the first antenna panel may be configured to send, to the first device (or to the obstacle), the signal for obtaining sensing information.

In an optional implementation, that the communication apparatus determines a first antenna panel based on the at least one piece of first information and the environment sensing information includes: The communication apparatus senses the first device by using the second antenna panel, to obtain updated first information of the first device. The communication apparatus determines, based on the updated first information of the first device and the environment sensing information, that an obstacle no longer exists between the first device and the communication apparatus. The communication apparatus determines the first antenna panel. If the communication apparatus determines that an obstacle no longer exists between the first device and the communication apparatus and the communication apparatus needs to communicate with the first device, the communication apparatus may allocate the first antenna panel to communicate with the first device. Certainly, if the communication apparatus has allocated the first antenna panel to the first device in advance to send the signal for obtaining sensing information, in this case, the communication apparatus may no longer allocate the first antenna panel to the first device, or the communication apparatus may adjust the allocated first antenna panel, to achieve better communication performance with the first device.

In an optional implementation, the signal for obtaining sensing information is a synchronization signal. In embodiments of this application, a communication signal may be used as a sensing signal. In this way, no dedicated sensing signal needs to be additionally disposed, which helps reduce signaling overheads. A sensing process of the communication apparatus may be performed periodically, and the synchronization signal is a periodic signal. A periodic sensing process can be implemented by using the synchronization signal as a first-type sensing signal, and a sensing requirement is satisfied. Certainly, in addition to the synchronization signal, another communication signal may be used as the sensing signal.

According to a third aspect, a communication apparatus is provided. The communication apparatus may be the communication apparatus according to the first aspect or the second aspect, or an electronic device (for example, a circuit system) configured in the communication apparatus, or a large device including the communication apparatus. The communication apparatus includes a corresponding means (means) or module configured to perform the method according to the first aspect or the second aspect. For example, the communication apparatus includes a processing unit (sometimes also referred to as a processing module) and a transceiver unit (sometimes also referred to as a transceiver module).

For example, the processing unit is configured to: determine that P antenna panels in the K antenna panels are used for communication, and determine that Q antenna panels in the K antenna panels are used for sensing, where both P and Q are positive integers less than or equal to N. The communication apparatus includes K antenna panels, and each antenna panel in the K antenna panels can be used for communication and/or sensing.

The processing unit is further configured to communicate with at least one device by using the transceiver unit and by using the P antenna panels.

The processing unit is further configured to sense the at least one device by using the transceiver unit and the Q antenna panels.

In another example, the processing unit is configured to communicate with at least one device by using the transceiver unit, to obtain at least one piece of first information, where the first information includes location information and/or motion information of the device.

The processing unit is further configured to sense an environment by using the transceiver unit to obtain environment sensing information, where the environment sensing information includes location information and/or motion information of an object in the environment.

The processing unit is further configured to determine a first antenna panel and/or a second antenna panel included in the transceiver unit based on the at least one piece of first information and the environment sensing information, where the first antenna panel is configured to communicate with a first device in the at least one device, and/or is configured to send, to the first device, a signal for obtaining sensing information, the second antenna panel is configured to receive sensing information from the first device, and the first antenna panel and the second antenna panel are different antenna panels.

In still another example, the communication apparatus includes a processor. The processor is coupled to a memory, and is configured to execute instructions in the memory, to implement the method performed by the communication apparatus in the first aspect or the second aspect. Optionally, the communication apparatus further includes other components, for example, an antenna, an input/output module, and an interface. The components may be hardware, software, or a combination of software and hardware.

According to a fourth aspect, another communication apparatus is provided. The communication apparatus may be the communication apparatus according to the first aspect or the second aspect, or an electronic device (for example, a circuit system) configured in the communication apparatus, or a large device including the communication apparatus. The communication apparatus and the communication apparatus according to the third aspect may be a same communication apparatus, or may be different communication apparatuses. The communication apparatus may include a processor, a communication circuit connected to the processor, and K antenna panels connected to the communication circuit, where K is a positive integer. A first part of antenna panels in the K antenna panels are configured to communicate with at least one device, and/or are configured to send, to some devices or all devices in the at least one device, a signal for obtaining sensing information, the first part of antenna panels include one or more antenna panels, a quantity of antenna panels communicating with one device is greater than or equal to 1, a second part of antenna panels in the K antenna panels are configured to receive sensing information from some devices or all devices in the at least one device, the second part of antenna panels include one or more antenna panels, a quantity of antenna panels configured to receive sensing information from one device is greater than or equal to 1, and the first part of antenna panels and the second part of antenna panels do not have an intersection.

In an optional implementation, a first antenna panel in the K antenna panels is configured to communicate with a first device in the at least one device, and/or configured to send, to the first device, the signal for obtaining sensing information, and a fifth antenna panel in the K antenna panels is configured to communicate with a second device in the at least one device, and/or configured to send, to the second device, the signal for obtaining sensing information. The first antenna panel and the fifth antenna panel satisfy one or more of the following relationships: a communication time of the first antenna panel is different from that of the fifth antenna panel; the first antenna panel and the fifth antenna panel use different communication frequencies; and a distance between the first antenna panel and the fifth antenna panel is greater than a third threshold.

In an optional implementation, a second antenna panel in the K antenna panels is configured to receive sensing information from the first device. The processor is configured to perform correlation processing based on the sensing information, to obtain first information of the first device, where the first information of the first device includes location information and/or motion information of the first device.

For technical effects brought by the fourth aspect or the optional implementations, refer to the descriptions of the technical effects of the first aspect or the corresponding implementations, or refer to the descriptions of the technical effects of the second aspect or the corresponding implementations.

According to a fifth aspect, a radar is provided. The radar may include the communication apparatus according to the third aspect, or include the communication apparatus according to the fourth aspect.

According to a sixth aspect, a computer-readable storage medium is provided. The computer-readable storage medium is configured to store a computer program or instructions.

When the computer program or the instructions is/are run, the method performed by the communication apparatus in the first aspect and/or the second aspect is implemented.

According to a seventh aspect, a computer program product including instructions is provided. When the instructions are run on a computer, the method according to the first aspect and/or the second aspect is implemented.

DESCRIPTION OF EMBODIMENTS

Figure 1:
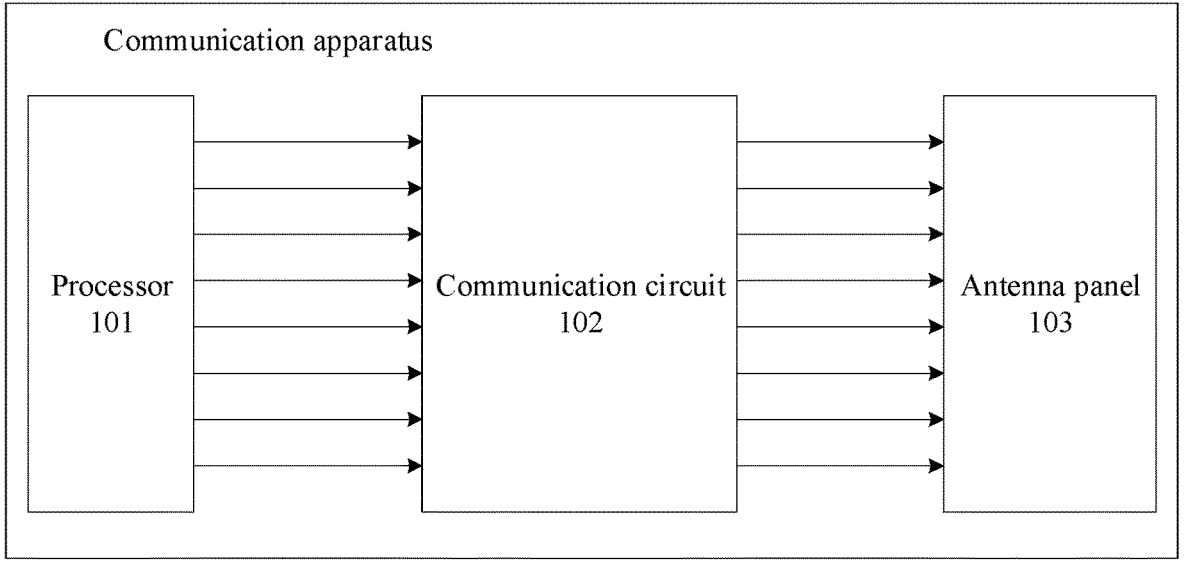
FIG. 1, FIG. 3, and FIG. 4 are several schematic diagrams of a structure of a communication apparatus according to an embodiment of this application.

To make objectives, technical solutions, and advantages of embodiments of this application clearer, the following further describes embodiments of this application in detail with reference to the accompanying drawings.

In the following descriptions, some terms in embodiments of this application are described, to help a person skilled in the art have better understanding.

(1) A radar (radar) may alternatively be referred to as a radar apparatus, a detector, a radar detection apparatus, a radar signal sending apparatus, or the like. A working principle of the radar is as follows: The radar transmits a signal (or referred to as a detection signal). The detection signal is reflected back by a target object after reaching the target object. The radar receives a signal (or referred to as a reflected signal) reflected by the target object, so that the radar may detect a location or the like of the target object based on the detection signal and the reflected signal. The signal transmitted by the radar may be a radar signal. Correspondingly, the received reflected signal reflected by the target object may also be a radar signal.

(2) A frequency modulated continuous wave (frequency modulated continuous wave, FMCW) is an electromagnetic wave whose frequency changes with time.

(3) An intermediate frequency (intermediate frequency, IF) signal: A frequency mixer processes a local oscillator signal of the radar and the reflected signal (a signal obtained through reflection, by the target object, of the signal transmitted by the radar) received by the radar, and a processed signal is further processed by using a low-pass filter to obtain the IF signal. Specifically, a part of a frequency modulated continuous wave signal generated by an oscillator is used as the local oscillator signal, and another part of the frequency modulated continuous wave signal is transmitted as a transmitted signal through a transmit antenna. A reflected signal that is reflected back after the transmitted signal touches the target object and that is received by a receive antenna is mixed with the local oscillator signal to obtain the "intermediate frequency signal". One or more pieces of location information, speed information, or angle information of the target object may be obtained based on the intermediate frequency signal. The location information may be location information of the target object relative to a current radar. The speed information may be speed information of the target object relative to the current radar. The angle information may be angle information of the target object relative to the current radar. Further, a frequency of the intermediate frequency signal is referred to as an intermediate frequency.

(4) In a sensing technology, a sensing device transmits a signal to the outside. After the signal reaches a target object, an echo signal is formed. The sensing device may determine a location, a shape, a motion feature, a moving trajectory, or the like of the target object by analyzing a feature of the received echo signal, so that a feature of the target object and a feature of a surrounding environment of the target object can be further deduced.

A sensing mode includes a mono-static sensing mode and a bi-static sensing mode. The mono-static sensing mode is also referred to as a transmitter and receiver co-located sensing mode, and the bi-static sensing mode is also referred to as a transmitter and receiver separated sensing mode. The mono-static sensing mode means that a device that sends a sensing signal and a device that receives a sensing signal are located in a same position, and generally means that the device that sends a sensing signal and the device that receives a sensing signal are a same device. For example, a system sends a sensing signal, and the sensing signal is reflected back after reaching a target object. The system receives the reflected sensing signal again, to obtain sensing information based on the reflected sensing signal. This is the mono-static sensing mode. The bi-static sensing mode means that a device that sends a sensing signal and a device that receives a sensing signal are separated and distributed in different positions, and generally means that a device that sends a sensing signal and a device that receives a sensing signal are different devices. For example, a system sends a sensing signal, the sensing signal is received by a target object, the target object sends a feedback signal to the system, and the system receives the feedback signal, to obtain sensing information. This is the bi-static sensing mode.

In embodiments of this application, unless otherwise specified, a quantity of nouns represents "a singular noun or a plural noun", that is, "one or more". "At least one" means one or more, and "a plurality of" means two or more. "And/or" describes an association relationship between associated objects, and represents that three relationships may exist. For example, A and/or B may represent the following three cases: Only A exists, both A and B exist, and only B exists. A and B may be singular or plural. The character "/" generally represents an "or" relationship between the associated objects. For example, AB represents A or B. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, a, b, and c, where a, b, and c may be singular or plural.

Ordinal numerals such as "first" and "second" mentioned in embodiments of this application are used to distinguish between a plurality of objects, and are not used to limit sizes, content, a sequence, a time sequence, application scenarios, priorities, importance degrees, or the like of the plurality of objects. For example, a first signal and a second signal may be a same signal, or may be different signals. In addition, this name does not indicate that the two signals are different in content, a sending sequence, priorities, application scenarios, importance degrees, or the like.

Some concepts in embodiments of this application are described above, and technical features in embodiments of this application are described below.

An embodiment of this application provides a communication apparatus. For example, the communication apparatus is disposed in a corresponding device. The device includes a network device (for example, a base station or a road side unit (road side unit, RSU)), a terminal device (for example, a mobile phone, a tablet computer, a smart household appliance, a wearable device, or a terminal RSU), or a radar. The radar is, for example, an in-vehicle radar, or may be another type of radar. Alternatively, the communication apparatus may be an independent device, or the communication apparatus may be disposed in another device. FIG. 1 is a schematic diagram of a structure of the communication apparatus. The communication apparatus may include a processor 101, a communication circuit 102 connected to the processor 101, and K antenna panels 103 connected to the communication circuit 102. The communication circuit 102 is connected between the processor 101 and the K antenna panels 103, and K is a positive integer. FIG. 1 shows only a box of one antenna panel 103, but does not indicate that there is one box. Instead, FIG. 1 shows an overall example of the K antenna panels 103. It may be understood that the box of the antenna panel 103 in FIG. 1 indicates the K antenna panels 103, where K may be equal to 1 or may be greater than 1. Optionally, the antenna panel may also be referred to as an antenna array surface, or may have another name.

Figure 2A:
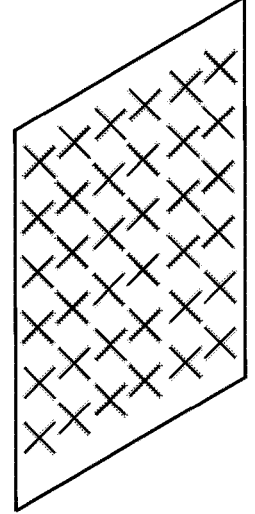
FIG. 2A is a schematic diagram of a structure of an antenna panel according to an embodiment of this application.

FIG. 2A is a schematic diagram of one antenna panel 103. One antenna panel 103 may include one or more antenna array elements, or in other words, one antenna panel is a combination of a group of antenna array elements. When an antenna panel 103 includes a larger quantity of antenna array elements, a beam (beam) transmitted by the antenna panel 103 is narrower, and directionality of the beam is better. One "x" in FIG. 2A represents one antenna array element. Certainly, the quantity and distribution manner of the antenna array elements shown in FIG. 2A are merely examples. A width of a beam transmitted by the antenna panel 103 is involved, and a beam width is an angle between two directions in which a radiation power decreases by 3 dB on two sides of a maximum radiation direction. An envelope form of the beam width is $\sin(nx)/\sin(x)$, where n represents a quantity of antenna array elements included in one antenna panel 103. It can be seen that when a value of n is larger, a beam transmitted by the antenna panel 103 is narrower, and directionality of the beam is better.

Figure 2B:
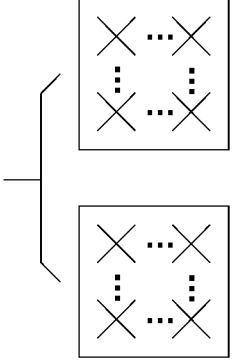
FIG. 2B and FIG. 2C are two schematic diagrams of a relationship between a beam width and a quantity of antenna panels according to an embodiment of this application.
Figure 2C:
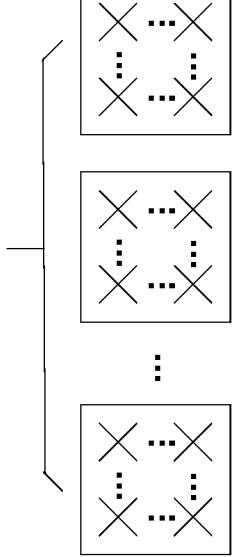

In addition, FIG. 2B and FIG. 2C are two schematic diagrams of a relationship between a beam width and a quantity of antenna panels 103. One box in FIG. 2B or FIG. 2C represents one antenna panel 103, and "x" in the box represents an antenna array element. In FIG. 2B, if there are a small quantity of antenna panels 103, for example, two antenna panels, a beam width synthesized by these antenna panels 103 may be large. In FIG. 2C, if there are a large quantity of antenna panels 103, for example, Q antenna panels, a beam width synthesized by these antenna panels 103 may be small. A narrow beam can cover a longer distance. Therefore, a wide beam may be used to send a signal to a device that is close, and a narrow beam may be used to send a signal to a device that is far away.

A first part of antenna panels in the K antenna panels 103 include, for example, P antenna panels 103. The P antenna panels 103 may be configured to communicate with at least one device in an environment, and/or may be configured to send, to some devices or all devices in the at least one device, a signal for obtaining sensing information, where P is a positive integer. The antenna panel 103 communicates with another device to complete a communication function, and the antenna panel 103 sends the signal for obtaining sensing information to complete a sensing function. In addition, a second part of antenna panels in the K antenna panels 103 include, for example, Q antenna panels 103, and the Q antenna panels 103 may receive sensing information from some devices or all devices in the at least one device, where Q is a positive integer. The antenna panel 103 receives sensing information, and is also configured to complete the sensing function. It may be understood that the first part of antenna panels may be used for communication and/or sensing, and the second part of antenna panels may be used for sensing. For example, the first part of antenna panels include one or more antenna panels 103, and each antenna panel 103 in these antenna panels 103 can send a communication signal and can receive a communication signal. For example, one antenna panel 103 sends and receives communication signals in a time division multiplexing (time division duplexing, TDD) manner. In addition, the antenna panels 103 included in the first part of antenna panels can also send a sensing signal, and the sensing signal may be used to obtain sensing information. The second part of antenna panels include one or more antenna panels 103, and each antenna panel 103 in the antenna panels 103 can receive sensing information. For example, if a sensing signal is sent by using one antenna panel 103 in the first part of antenna panels, sensing information corresponding to the sensing signal can be received by the antenna panels 103 included in the second part of antenna panels. It should be understood that each antenna panel 103 in the K antenna panels 103 can send the communication signal, receive the communication signal, and send the signal for obtaining sensing information, and can also receive sensing information. In embodiments of this application, the K antenna panels 103 are divided into two parts, so that different parts implement different functions, thereby better implementing work division, and mixing of the communication signal and the sensing signal can be reduced.

The communication apparatus provided in embodiments of this application can support a mono-static sensing mode and a bi-static sensing mode. For example, for the mono-static sensing mode, the communication apparatus may send a sensing signal by using the antenna panels 103 included in the first part of antenna panels, and the sensing signal is reflected back after reaching a target object. Next, a system receives the reflected sensing signal by using the antenna panels 103 included in the second part of antenna panels, to obtain sensing information based on the reflected sensing signal. For the bi-static sensing mode, the communication apparatus may send a sensing signal by using the antenna panels 103 included in the first part of antenna panels. The sensing signal is received by the target object, the target object sends a feedback signal to the system, and the system receives the feedback signal by using the antenna panels 103 included in the second part of antenna panels, to obtain sensing information based on the feedback signal. In addition, if there is another sensing mode, the another sensing mode can also be supported in embodiments of this application.

As described above, the first part of antenna panels may include one or more antenna panels 103, the second part of antenna panels may also include one or more antenna panels 103, and the first part of antenna panels and the second part of antenna panels may have no intersection. In the first part of antenna panels, a quantity of antenna panels that can communicate with one device in the at least one device may be greater than or equal to 1. In the second part of antenna panels, a quantity of antenna panels that can receive sensing information from one device in the at least one device may be greater than or equal to 1. For example, the first part of antenna panels include four antenna panels 103, and the second part of antenna panels also include four antenna panels 103. The communication apparatus may allocate two antenna panels 103 in the first part of antenna panels to a device 1 in the at least one device, so that the communication apparatus communicates with the device 1, and the communication apparatus may further send, to the device 1, the signal for obtaining sensing information. In addition, the communication apparatus may allocate remaining two antenna panels 103 in the first part of antenna panels to a device 2 in the at least one device, so that the communication apparatus communicates with the device 2, and the communication apparatus may further send, to the device 2, the signal for obtaining sensing information. In addition, the communication apparatus may further allocate one antenna panel 103 in the second part of antenna panels to the device 1, so that the communication apparatus receives sensing information from the device 1. How to determine a quantity of antenna panels 103 to be allocated to a device for communication and how to determine a quantity of antenna panels 103 to be allocated to a device for sensing are described in the following embodiments.

In embodiments of this application, one or more antenna panels 103 in the first part of antenna panels may send the signal for obtaining sensing information, and one or more antenna panels 103 in the second part of antenna panels may receive sensing information from another device. The sensing information may be carried in a corresponding signal. The signal for obtaining sensing information is a signal sent by the communication apparatus, and the signal carrying sensing information is a signal received by the communication apparatus. Although the signal for obtaining sensing information and the signal for carrying sensing information are transmitted in different directions, both the two types of signals are signals used to implement the sensing function. Therefore, both the two types of signals may be referred to as sensing signals. For ease of differentiation, a signal (in other words, the signal for obtaining sensing information) that is sent by the communication apparatus and that is used to implement the sensing function may be referred to as a first-type sensing signal, and a signal that is received by the communication apparatus and that carries sensing information (in other words, the communication apparatus can obtain sensing information based on the signal) is referred to as a second-type sensing signal.

In an optional implementation, in embodiments of this application, the first-type sensing signal may be implemented by using a communication signal, that is, the communication signal can implement both the communication function and the sensing function, thereby improving utilization of the communication signal. In addition, a signal dedicated to sensing does not need to be additionally disposed, so that signaling overheads can be reduced. For example, a communication signal that can implement the first-type sensing signal is a synchronization signal, and the synchronization signal is, for example, a synchronization signal and physical broadcast channel block (synchronization signal and physical broadcast channel block, SSB), or a channel state information-reference signal (channel state information-reference signal, CSI-RS). Alternatively, in addition to the synchronization signal, another communication signal may be used as the first-type sensing signal. For example, a communication signal with a payload (payload) is used as the first-type sensing signal, and the payload of the communication signal may indicate that the communication signal is used to obtain sensing information.

In another optional implementation, in embodiments of this application, the first-type sensing signal may be implemented by using a signal used to implement the sensing function. For example, a frequency modulated continuous wave (frequency modulated continuous wave, FMCW) signal may be used as the first-type sensing signal. Signals used to implement the sensing function generally have a low peak to average power ratio (peak to average power ratio, PAPR) and good performance.

The processor 101 is, for example, a baseband (baseband, BB) apparatus, for example, a baseband chip, or the processor 101 is, for example, an integrated circuit disposed on a baseband chip. The integrated circuit includes, for example, one or more application-specific integrated circuits (application-specific integrated circuit, ASIC), or includes one or more digital signal processors (digital signal processor, DSP), or includes one or more field programmable gate arrays (field programmable gate array, FPGA), or the integrated circuit includes a combination of these types of integrated circuits.

Figure 3:
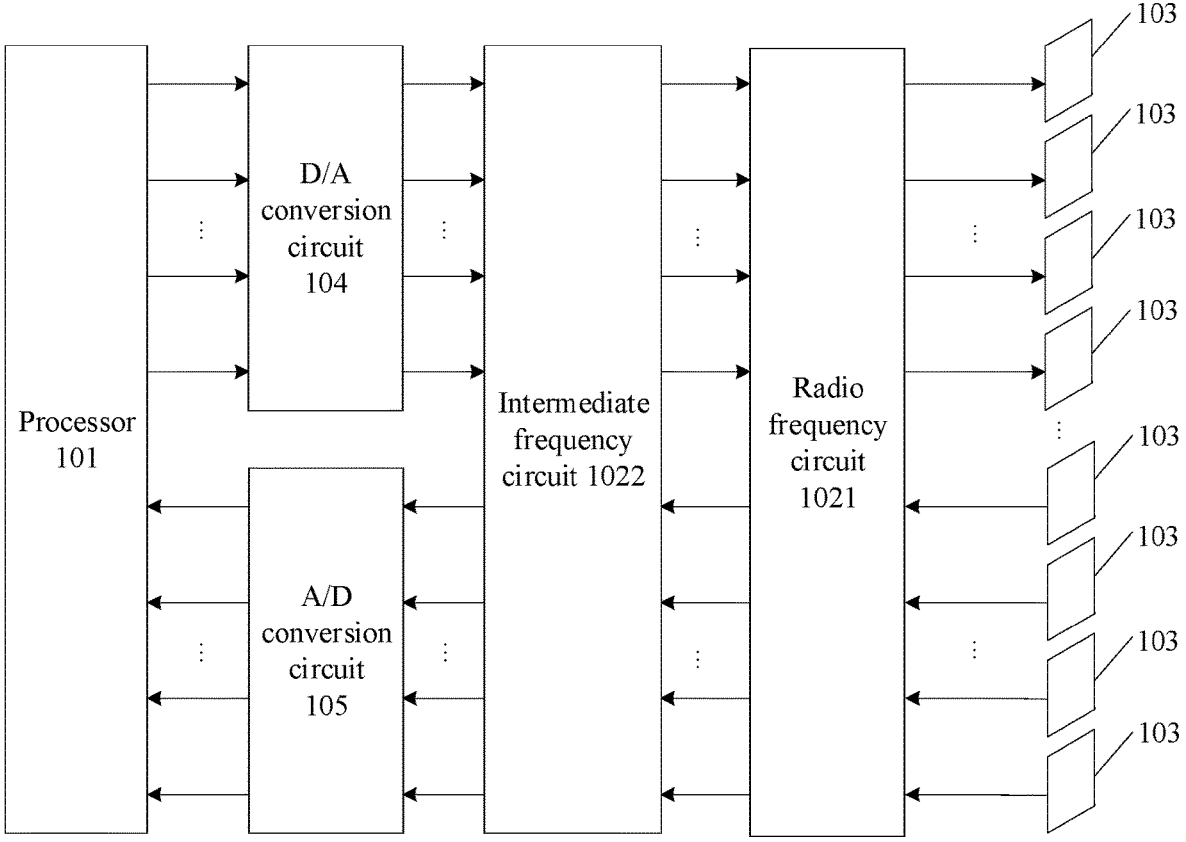
Figure 4:
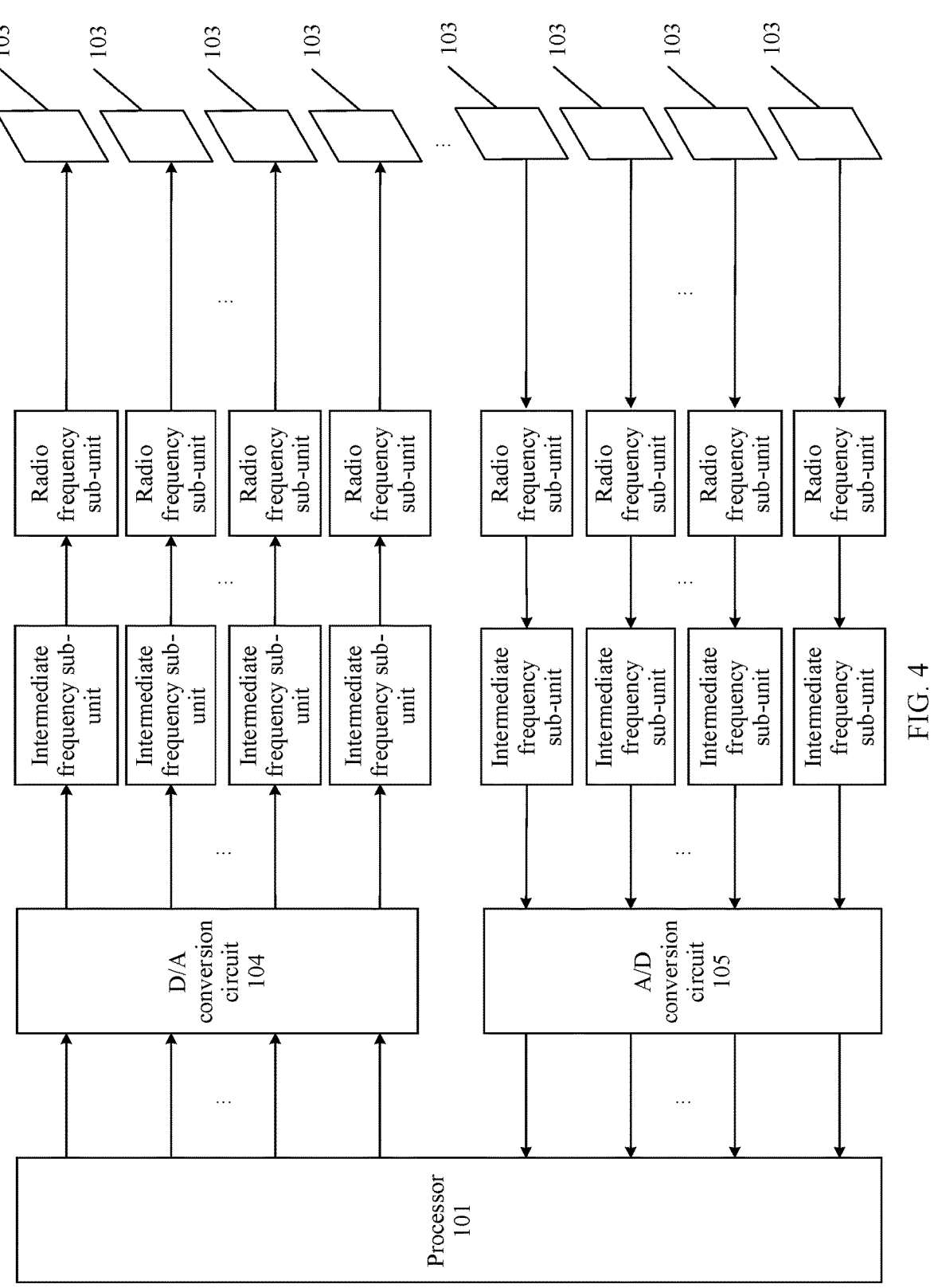

The communication circuit 102 may include a radio frequency (radio frequency, RF) circuit 1021 and/or an intermediate frequency circuit 1022. For this, refer to FIG. 3. In FIG. 3, an example in which the communication circuit 102 includes the radio frequency circuit 1021 and the intermediate frequency circuit 1022 is used. In FIG. 3, the communication circuit 102 is no longer represented, but is replaced with the radio frequency circuit 1021 and the intermediate frequency circuit 1022. In an optional implementation, the radio frequency circuit 1021 may be a whole, and the radio frequency circuit 1021 may serve the K antenna panels 103. For example, the radio frequency circuit 1021 may include K radio frequency sub-units, where the radio frequency sub-units are connected to the antenna panel 103 in a one-to-one correspondence, one radio frequency sub-unit is connected to one antenna panel 103, and the radio frequency sub-unit connected to the antenna panel 103 is responsible for sending or receiving a signal by using the antenna panel 103. Alternatively, the radio frequency circuit 1021 may not be divided into submodules, but is connected to the K antenna panels 103 as a whole, and sends or receives a signal by using the K antenna panels 103. Alternatively, in another optional implementation, the radio frequency circuit 1021 may include K radio frequency sub-circuits. For this, refer to FIG. 4. In FIG. 4, an example in which the communication circuit 102 includes the radio frequency circuit 1021 and the intermediate frequency circuit 1022 is also used. The radio frequency sub-circuits are connected to the antenna panels 103 in a one-to-one correspondence, one radio frequency sub-circuit is connected to one antenna panel 103, and the radio frequency sub-circuit connected to the antenna panel 103 is responsible for sending or receiving a signal by using the antenna panel 103.

The same applies to the intermediate frequency circuit 1022. In an optional implementation, the intermediate frequency circuit 1022 may be a whole, and the intermediate frequency circuit 1022 may serve the K antenna panels 103. For example, the intermediate frequency circuit 1022 may include K intermediate frequency sub-units, where the intermediate frequency sub-units are connected to the antenna panel 103 in a one-to-one correspondence, one intermediate frequency sub-unit is connected to one antenna panel 103, and the intermediate frequency sub-unit connected to the antenna panel 103 is responsible for sending or receiving a signal by using the antenna panel 103. Alternatively, the intermediate frequency circuit 1022 may not be divided into submodules, but is connected to the K antenna panels 103 as a whole, and sends or receives a signal by using the K antenna panels 103. Alternatively, in another optional implementation, the intermediate frequency circuit 1022 may include K intermediate frequency sub-circuits. For details, continue to refer to FIG. 4. The intermediate frequency sub-circuits are connected to the antenna panels 103 in a one-to-one correspondence, one intermediate frequency sub-circuit is connected to one antenna panel 103, and the intermediate frequency sub-circuit connected to the antenna panel 103 is responsible for sending or receiving a signal by using the antenna panel 103. In FIG. 4, the communication circuit 102, the radio frequency circuit 1021, and the intermediate frequency circuit 1022 are no longer represented. Instead, the radio frequency circuit 1021 is replaced with a radio frequency sub-unit, the intermediate frequency circuit 1022 is replaced with an intermediate frequency sub-unit, and the communication circuit 102 is considered to be replaced with a radio frequency sub-unit and an intermediate frequency sub-unit.

Optionally, the communication apparatus may further include a digital (digital, D)/analog (analog, A) conversion circuit 104 and an A/D conversion circuit 105. Refer to FIG. 3 or FIG. 4. The A/D conversion circuit 105 is configured to convert an analog signal into a digital signal, and the D/A conversion circuit 104 is configured to convert a digital signal into an analog signal. The D/A conversion circuit 104 is connected between the processor 101 and the intermediate frequency circuit 1022, and the A/D conversion circuit 105 is also connected between the processor 101 and the intermediate frequency circuit 1022. The D/A conversion circuit 104 may be connected to the first part of antenna panels, and the A/D conversion circuit 105 may be connected to the second part of antenna panels.

The communication circuit 102 may include two processing parts: a sending part and a receiving part. The sending part mainly makes a low-frequency analog signal from the D/A conversion circuit 104 and a high-frequency carrier provided by a local oscillator enter a frequency mixer together to perform up conversion, to obtain a radio frequency modulation signal. The radio frequency modulation signal reaches the antenna panel 103, and may be radiated into space through the antenna panel 103.

The receiving part mainly receives a signal from space through coupling of the antenna panel 103. The received weak signal is amplified by a low noise amplifier and then makes the amplified signal and a local oscillation signal enter the frequency mixer together to perform down conversion, to obtain a signal including an intermediate frequency signal component. The receiving part may include a filter. After obtaining a valid intermediate frequency signal through filtering, the filter may input the valid intermediate frequency signal into the A/D conversion circuit 105 to convert the valid intermediate frequency signal into a digital signal, and then the digital signal enters a digital processing part for processing.

In FIG. 1, FIG. 3, or FIG. 4, an arrow represents a digital channel, or is referred to as a transmission channel, and data may be transmitted through the transmission channel. One transmission channel starts with entering the processor 101 and ends with entering one antenna panel 103. It can be seen that eight transmission channels are provided in each of FIG. 1, FIG. 3, and FIG. 4. However, during actual application, a quantity of transmission channels may be greater than 8, or may be less than 8. It can be learned that one antenna panel 103 corresponds to one transmission channel. Therefore, one antenna panel 103 may send one piece of data.

In embodiments of this application, the communication apparatus may allocate different antenna panels 103 to one device for communication and sensing, so that an antenna panel 103 for communication and an antenna panel 103 for sensing can work separately, and the communication apparatus can clearly determine whether a received signal is a communication signal or a sensing signal, thereby improving the accuracy of processing the communication apparatus. In addition, there is no need to arrange two hardware systems in the communication apparatus, and only one hardware system is required to implement the sensing and communication functions. In this way, a size of the communication apparatus is reduced, and costs of the communication apparatus are reduced.

Figure 5:
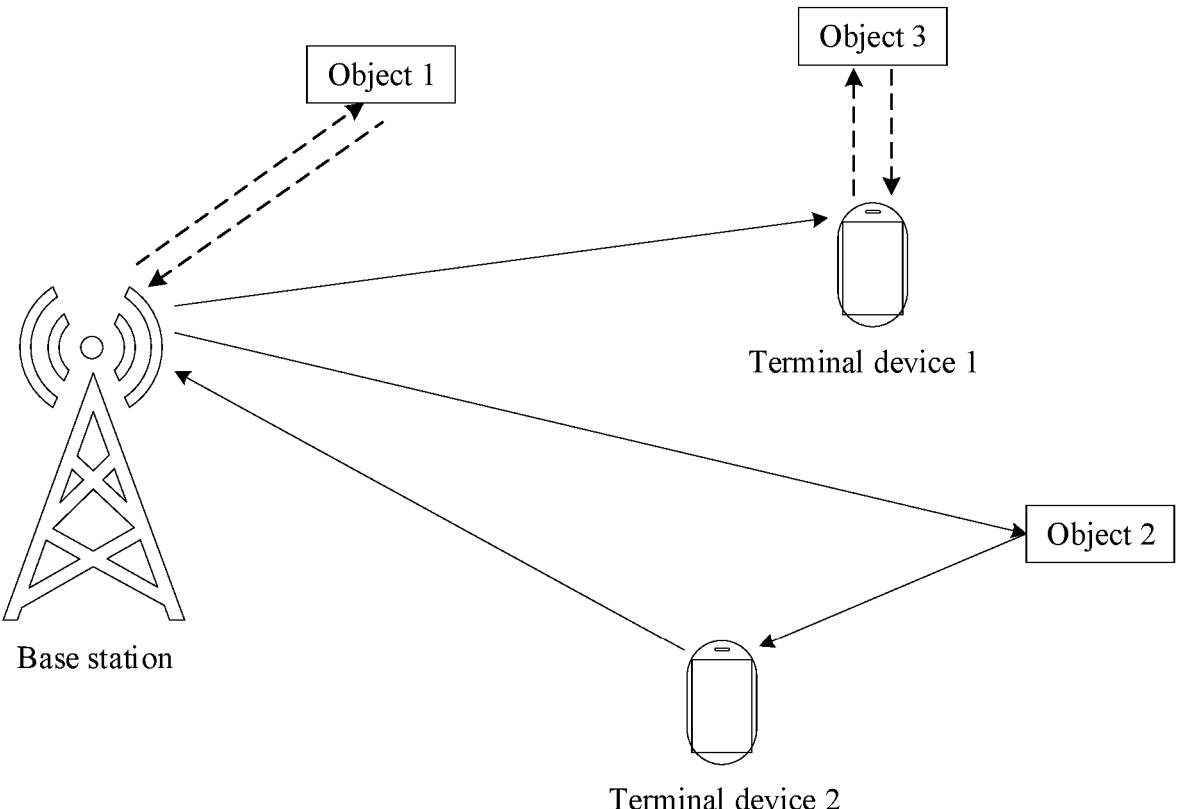
FIG. 5 is a schematic diagram of an application scenario according to an embodiment of this application.

The communication apparatus provided in embodiments of this application is described above. FIG. 5 is a schematic diagram of an application scenario according to an embodiment of this application. FIG. 5 includes a base station and a terminal device, and further includes a non-device object 1, a non-device object 2, and a non-device object 3. For example, the terminal device is a mobile phone. The communication apparatus provided in FIG. 1, FIG. 3, or FIG. 4 may be disposed on a base station side and used as a component of the base station, and/or the communication apparatus may be disposed in a mobile phone. In addition, the communication apparatus may alternatively be disposed in a device such as a radar. In FIG. 5, the communication apparatus is disposed in each of the base station and a terminal device 1. A solid arrow represents transmission of a communication signal, and a dashed arrow represents transmission of a sensing signal. An arrow between the base station, a terminal device 2, and the object 2 indicates that a signal sent by the base station to the terminal device 2 is reflected by the object 2 to the terminal device 2. In addition, the terminal device 2 in FIG. 5 does not transmit a sensing signal. It may be that the communication apparatus is not disposed in the terminal device 2, or the communication apparatus is disposed in the terminal device 2, but the sensing signal is not transmitted currently.

Figure 6:
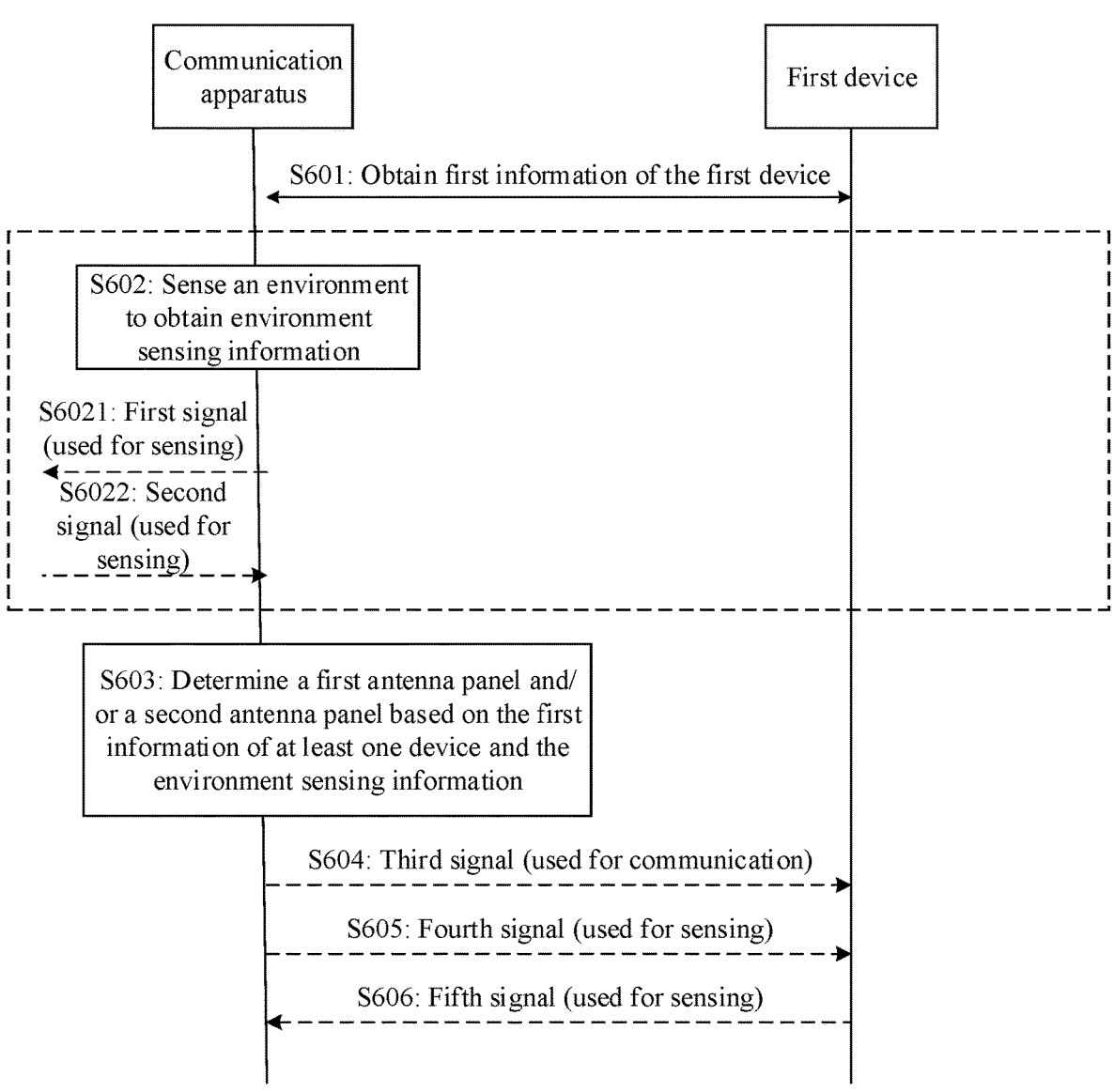
FIG. 6 is a flowchart of a communication method according to an embodiment of this application.

The method provided in embodiments of this application is described below. The method is applied to, for example, the scenario shown in FIG. 5, or may be applied to another scenario, for example, a radar operating scenario. The communication apparatus mentioned in the method is, for example, the communication apparatus shown in FIG. 1, FIG. 3, or FIG. 4. FIG. 6 is a flowchart of the method.

S601: The communication apparatus communicates with at least one device to obtain at least one piece of first information. The at least one device may include one device, two devices, or a plurality of devices. For example, the at least one device includes all devices or some devices that can communicate with the communication apparatus. The communication apparatus can obtain first information of a device by communicating with the device, and can obtain first information of each device in the at least one device by communicating with the at least one device. Certainly, content included (or indicated) in the first information of different devices may be the same or may be different. In FIG. 6, for example, the communication apparatus communicates with a first device in the at least one device, to obtain the first information of the first device. The first information of a device may include location information of the device, or motion information of the device, or location information and motion information of the device. The location information of a device may indicate a current location of the device and/or a distance between the device and the communication apparatus. The motion information of a device may indicate one or more of the following: the device is in a moving state or a stationary state, a movement direction of the device, or a moving speed of the device. Certainly, in addition, the motion information of a device may further indicate other motion-related information of the device.

The communication apparatus may preliminarily divide antenna panels 103 included in the communication apparatus into two parts according to a detection requirement. The detection requirement includes, for example, a detection range. The two parts may be different from the first part of antenna panels and the second part of antenna panels. Therefore, the two parts initially divided by the communication apparatus are respectively referred to as a third part of antenna panels and a fourth part of antenna panels. A quantity of antenna panels 103 included in the first part of antenna panels and a quantity of antenna panels 103 included in the second part of antenna panels may be equal to a total quantity of antenna panels 103 included in the communication apparatus, and a quantity of antenna panels 103 included in the third part of antenna panels and a quantity of antenna panels 103 included in the fourth part of antenna panels may also be equal to the total quantity of antenna panels 103 included in the communication apparatus. For example, the total quantity of antenna panels 103 included in the communication apparatus is K.

The third part of antenna panels include N antenna panels 103. The N antenna panels 103 may be configured to communicate with at least one device in an environment, or the N antenna panels 103 may be configured to send a first-type sensing signal to some devices or all devices in the at least one device, or the N antenna panels 103 may be configured to communicate with at least one device in an environment, and may be configured to send a first-type sensing signal to some devices or all devices in the at least one device. The N antenna panels 103 may be completely the same as the antenna panels 103 included in the first part of antenna panels, or the N antenna panels 103 and the antenna panels 103 included in the first part of antenna panels may have an intersection, but are not completely the same, or the N antenna panels 103 and the antenna panels 103 included in the first part of antenna panels may have no intersection. N is a positive integer.

The fourth part of antenna panels include M antenna panels 103, and the M antenna panels 103 may receive second-type sensing signals from some devices or all devices in the at least one device. It may be understood that, the antenna panels 103 included in the third part of antenna panels can send a communication signal and can also receive a communication signal. In addition, the antenna panels 103 included in the third part of antenna panels can also send the first-type sensing signal, and the first-type sensing signal may be used to obtain sensing information. The antenna panels 103 included in the fourth part of antenna panels can receive the second-type sensing signal. For example, the first-type sensing signal is sent by using one antenna panel 103 in the third part of antenna panels, and the second-type sensing signal corresponding to the first-type sensing signal can be received by the antenna panels 103 included in the fourth part of antenna panels. The communication apparatus can obtain sensing information based on the second-type sensing signal. M is a positive integer, for example, M+N=K.

For example, if a range that needs to be detected by the communication apparatus is 100 meters, the communication apparatus may add a small quantity of antenna panels 103 to the fourth part of antenna panels. Because a distance that needs to be detected is short, sensing can be completed by using a small quantity of antenna panels 103. In another example, if a range that needs to be detected by the communication apparatus is 300 meters, the communication apparatus may add a large quantity of antenna panels 103 to the fourth part of antenna panels. Because a distance that needs to be detected is long, sensing may be performed by using the large quantity of antenna panels 103.

A process in which the communication apparatus divides the antenna panels into the third part of antenna panels and the fourth part of antenna panels is only a preliminary division process. After determining the third part of antenna panels and the fourth part of antenna panels, the communication apparatus may communicate with at least one device by using all or some antenna panels 103 included in the third part of antenna panels, to obtain the first information of each device in the at least one device.

For example, the communication apparatus is disposed in a base station, and a terminal device requires a service provided by the base station. The terminal device needs to perform random access to the base station. The communication apparatus may communicate with the terminal device by using one or more antenna panels 103 included in the third part of antenna panels, and obtain first information of the terminal device in a random access process with the terminal device. Alternatively, the communication apparatus is disposed in a terminal device. The terminal device may communicate with another terminal device by using one or more antenna panels 103 included in the third part of antenna panels. The terminal device may obtain first information of the another terminal device in a communication process.

S602: The communication apparatus senses an environment to obtain environment sensing information. The environment sensing information may include location information of an object in the environment, or include motion information of the object in the environment, or include the location information and the motion information of the object in the environment. The location information of an object may indicate a current location of the object and/or indicate a distance between the object and the communication apparatus. The motion information of an object may indicate one or more of the following: the object is in a moving state or a stationary state, a moving direction of the object, or a moving speed of the object. Certainly, in addition, the motion information of an object may further indicate other motion-related information of the object. The "object" may include a device, or may include another object other than the device, for example, include an object without a communication capability, for example, a building, a house, or a tree.

After determining the third part of antenna panels and the fourth part of antenna panels, the communication apparatus may sense the environment by using all or some antenna panels 103 included in the fourth part of antenna panels, to obtain the environment sensing information. For example, for a process in which the communication apparatus senses the environment, refer to S6021 and S6022. S6021 and S6022 are optional steps, and are represented by dashed lines in FIG. 6.

S6021: The communication apparatus sends a first signal to a target object in the environment by using a third antenna panel.

The third antenna panel includes, for example, one or more antenna panels 103 in the third part of antenna panels, and the first signal is a first-type sensing signal. For an implementation of the first-type sensing signal, refer to the foregoing description. In this case, the first signal may be a communication signal, for example, a synchronization signal, or may be another communication signal. A sensing process of the communication apparatus may be performed periodically, and the synchronization signal is a periodic signal. A periodic sensing process can be implemented by using the synchronization signal as a first-type sensing signal, and a sensing requirement is satisfied. In addition, the periodic signal does not need to be additionally set as the first-type sensing signal, which helps reduce signaling overheads. In addition, it is considered that some sensing processes may be triggered by events. For example, in addition to periodic sensing, the communication apparatus may need to temporarily sense an object at a moment. Therefore, another communication signal may be used as the first-type sensing signal. In this way, the sensing process may be more flexible, and a dedicated sensing signal does not need to be additionally set. Alternatively, the first signal may be a signal dedicated to implementing a sensing function, for example, an FMCW signal. The signal dedicated to implementing the sensing function is used as the first-type sensing signal, so that a PAPR of the first-type sensing signal is lower and sensing performance is better.

The target object is, for example, a non-device object, for example, a building, a tree, or a house, or the target object may be a device. The device is, for example, one device in the at least one device, or the device may not belong to the at least one device.

S6022: The communication apparatus receives a second signal from the target object by using a fourth antenna panel.

The fourth antenna panel includes, for example, one or more antenna panels 103 in the fourth part of antenna panels, and the second signal is a second-type sensing signal. If a mono-static sensing mode is used, the second signal may be a reflected signal of the first signal, that is, the second signal is a signal reflected by the target object after the first signal reaches the target object. If a bi-static sensing mode is used, the second signal may be a signal generated based on the first signal. For example, after the first signal is received by the target object, the target object generates a feedback signal of the first signal, and sends the feedback signal to the communication apparatus. The communication apparatus receives the feedback signal by using the fourth antenna panel, and the feedback signal is the second signal.

As described above, the communication apparatus may obtain sensing information based on a second-type signal. For example, a manner in which the communication apparatus obtains sensing information is: The communication apparatus performs correlation processing based on the second-type signal, to obtain sensing information. For example, a manner in which the communication apparatus obtains sensing information of the target object is: The communication apparatus performs correlation processing based on the second signal, to obtain the sensing information of the target object. In embodiments of this application, the communication apparatus may perform correlation processing based on the second signal by using the processor 101, to obtain the sensing information of the target object. The correlation processing is, for example, calculation by using a correlation algorithm. For example, a part of a signal generated by the communication apparatus is used as a local oscillator signal, and the other part is used as the first signal and is transmitted by using the third antenna panel. After the fourth antenna panel receives the second signal, the processor 101 may perform correlation processing on the local oscillator signal and the second signal. For example, a process of the correlation processing includes: The processor 101 performs frequency mixing on the local oscillator signal and the second signal to obtain an intermediate frequency signal, so that the sensing information of the target object can be obtained based on the intermediate frequency signal. For example, the sensing information of the target object may indicate location information and/or motion information of the target object.

In other words, in embodiments of this application, the processor 101 may perform correlation processing on the second-type signal, and the communication circuit 102 does not perform correlation processing on the second-type signal. If the communication circuit 102 performs correlation processing on the second-type signal, if the first-type signal is a communication signal, a processing result may be inaccurate. However, in embodiments of this application, the processor 101 performs correlation processing on the second-type signal, so that a problem caused when the processing is performed by the communication circuit 102 is resolved. In this way, the communication apparatus in embodiments of this application can use a communication signal as a sensing signal, so that signaling overheads are reduced, and the communication apparatus in embodiments of this application can complete both a communication function and the sensing function, thereby implementing integration of communication and sensing.

To sense the environment, the communication apparatus may send the first-type sensing signal to the environment, and obtain the environment sensing information by receiving the second-type sensing signal from the environment. For example, the communication apparatus may send the first-type sensing signal to one or more target objects in the environment, and the target object in S6021 may be the target object or one of the plurality of target objects. The communication apparatus may obtain the sensing information of the one or more target objects by sensing the one or more target objects, so that the environment sensing information can be obtained based on the sensing information of the one or more target objects. For example, the environment sensing information includes the sensing information of the one or more target objects in the environment. The sensing information of a target object may include, for example, location information and/or motion information of the target object. Therefore, the environment sensing information may include location information and/or motion information of the one or more target objects in the environment.

S603: The communication apparatus determines a first antenna panel and/or a second antenna panel based on the at least one piece of first information and the environment sensing information.

After obtaining the environment sensing information and the at least one piece of first information, the communication apparatus may allocate antenna panels 103 used for communication to some devices or all devices in the at least one device, and may further allocate antenna panels 103 used for sensing to some devices or all devices in the at least one device. For example, a moving speed, a movement direction, or the like of a moving obstruction (for example, a vehicle) may be obtained by using the environment sensing information and/or the at least one piece of first information, and the communication apparatus may predict, based on the obtained moving speed or movement direction, impact caused by the moving obstruction on communication of the communication apparatus. In another example, location information of a fixed obstruction may be obtained by using the environment sensing information and/or the at least one piece of first information. The communication apparatus may determine a coverage hole based on the location information, to predict, based on a movement direction of the communication apparatus, whether the communication apparatus is to enter the coverage hole. If the communication apparatus is to enter the coverage hole, the communication apparatus may consider performing processing such as a cell handover, to improve service continuity. In still another example, motion information of some devices or all devices in the at least one device may be determined by using the environment sensing information and/or the at least one piece of first information, and information about a distance between each device in the some devices or all devices in the at least one device and the communication apparatus may be further determined. If a device moves at a fast speed in a direction away from the communication apparatus, the communication apparatus may consider using a plurality of antenna panels 103 to track (sense) the device in a manner of synthesizing a narrow beam. If a device is moving horizontally, and another device is still in a stationary state in a same area, the communication apparatus may consider using a small quantity of antenna panels 103 to track the device by synthesizing a wide beam, and the like. In summary, the environment sensing information and the at least one piece of first information may include the at least one device and physical feature information of the environment. Interference, an obstacle, a moving speed, a movement direction of the device, and the like that exist in the environment can be determined by using the environment sensing information and the at least one piece of first information. The physical feature information can be used to predict a next change in the environment and assist the communication apparatus in making appropriate selection, and the antenna panels 103 are allocated to the at least one device, to ensure awareness of the environment and service continuity of the communication apparatus.

Whether antenna panels 103 used for communication need to be allocated to a device may depend on whether the communication apparatus needs to communicate with the device, or may depend on whether the communication apparatus needs to sense the device. If the communication apparatus needs to communicate with the device but does not need to sense the device, antenna panels 103 used for communication may be allocated to the device. If the communication apparatus needs to sense the device but does not need to communicate with the device, antenna panels 103 used for communication may be allocated to the device. In this case, the antenna panels 103 may be configured to complete the sensing function. If the communication apparatus needs to communicate with the device and also needs to sense the device, antenna panels 103 used for communication may be allocated to the device. In this case, the antenna panels 103 may be configured to complete the communication function, and may also be configured to complete the sensing function. If the communication apparatus does not need to communicate with the device and also does not need to sense the device, the communication apparatus may not allocate antenna panels 103 used for communication to the device. If determining to allocate antenna panels 103 used for communication to the device, the communication apparatus may perform allocation based on the environment sensing information and the at least one piece of first information. It should be noted that the antenna panels 103 that are allocated by the communication apparatus to the device and that are used for communication are located in the communication apparatus. For example, these antenna panels 103 are used for communication between the communication apparatus and the device. That is, if communicating with the device, the communication apparatus uses these antenna panels 103. In addition, if needing to sense the device, the communication apparatus also uses these antenna panels 103.

In addition, whether antenna panels 103 used for sensing need to be allocated to a device may depend on whether the communication apparatus needs to sense the device. If the communication apparatus needs to sense the device, antenna panels 103 used for sensing may be allocated to the device. If the communication apparatus does not need to sense the device, it may be not necessary to allocate antenna panels 103 used for sensing to the device. If determining to allocate antenna panels 103 used for sensing to the device, the communication apparatus may perform allocation based on the environment sensing information and the at least one piece of first information. It should be noted that the antenna panels 103 that are allocated by the communication apparatus to the device and that are used for sensing are located in the communication apparatus. For example, these antenna panels 103 are used by the communication apparatus to sense the device. In other words, if sensing the device, the communication apparatus uses these antenna panels 103.

The communication apparatus allocates antenna panels 103 to some devices or all devices in the at least one device, and a process of allocating antenna panels 103 to each device in the devices may be similar. Therefore, in embodiments of this application, the process of allocating antenna panels 103 to the first device in the at least one device by the communication apparatus is used as an example for description. For example, the communication apparatus allocates the first antenna panel, the second antenna panel, or the first antenna panel and the second antenna panel to the first device based on the at least one piece of first information and the environment sensing information. The first antenna panel and the second antenna panel are different antenna panels. The first antenna panel may include one or more antenna panels 103, and the second antenna panel 103 may also include one or more antenna panels 103. The first antenna panel may be used for communication between the communication apparatus and the first device, and may also be used for the communication apparatus to send the first-type sensing signal to the first device. The second antenna panel may be used for the communication apparatus to receive the second-type sensing signal from the first device. The antenna panels 103 included in the first antenna panel may belong to the third part of antenna panels, or may belong to the fourth part of antenna panels, or a part of the antenna panels belong to the third part of antenna panels, and another part of the antenna panels belong to the fourth part of antenna panels. The antenna panels 103 included in the second antenna panel may belong to the fourth part of antenna panels, or may belong to the third part of antenna panels, or a part of the antenna panels belong to the fourth part of antenna panels, and another part of the antenna panels belong to the third part of antenna panels. That is, the third part of antenna panels and the fourth part of antenna panels are only preliminary division. After the at least one piece of first information and the environment sensing information are obtained, when allocating antenna panels 103 to the at least one device, the communication apparatus may not perform allocation based on the third part of antenna panels and the fourth part of antenna panels. In this case, it may be considered that the division manner of the fourth part of antenna panels and the fourth part of antenna panels no longer exists, and the communication apparatus allocates antenna panels 103 in K antenna panels 103 to the at least one device. After the communication apparatus allocates antenna panels 103 to the at least one device, in the allocated antenna panels 103, antenna panels 103 used for communicating with the device may belong to the first part of antenna panels mentioned above, and antenna panels used for receiving the second-type sensing signal from another device may belong to the second part of antenna panels mentioned above. That is, the K antenna panels 103 are divided into the first part of antenna panels and the second part of antenna panels. This division process may not exist, and it may be considered, based on only an allocation result of the communication apparatus, that the first part of antenna panels and the second part of antenna panels exist.

Next, how the communication apparatus allocates antenna panels 103 to the first device based on the at least one piece of first information and the environment sensing information is described.

For example, the communication apparatus may determine, based on the first information of the first device and the environment sensing information, whether an obstacle exists between the first device and the communication apparatus. If it is determined that an obstacle exists between the first device and the communication apparatus, the communication apparatus determines that the communication apparatus cannot communicate with the first device temporarily. The communication apparatus may temporarily not allocate antenna panels 103 used for communication to the first device. However, the communication apparatus may allocate antenna panels 103 used for sensing to the first device. The communication apparatus may allocate one or more antenna panels 103 as second antenna panels to the first device. That is, the communication apparatus temporarily does not allocate the first antenna panel to the first device, but can allocate the second antenna panel to the first device. The communication apparatus may continue to sense the first device by using the second antenna panel, to obtain updated first information of the first device. For a process in which the communication apparatus senses the first device by using the second antenna panel, refer to the foregoing description of the process in which the communication apparatus senses the environment. After obtaining the updated first information of the first device, the communication apparatus may determine, based on the updated first information of the first device and the environment sensing information, whether an obstacle exists between the first device and the communication apparatus. If an obstacle still exists, the communication apparatus may continue to sense the first device by using the second antenna panel. If an obstacle no longer exists between the first device and the communication apparatus, the communication apparatus may allocate antenna panels 103 for communication to the first device. The communication apparatus may allocate one or more antenna panels 103 to the first device as first antenna panels 103, to communicate with the first device.

Alternatively, if it is determined that an obstacle exists between the first device and the communication apparatus, the communication apparatus determines that the communication apparatus cannot communicate with the first device temporarily. The communication apparatus may temporarily not allocate antenna panels 103 used for communication to the first device, or may temporarily not allocate antenna panels 103 used for sensing to the first device. That is, the communication apparatus temporarily does not allocate the first antenna panel to the first device, but can allocate the second antenna panel to the first device. However, the communication apparatus may continue to sense the environment, to obtain updated environment sensing information. For example, the communication apparatus may sense an obstacle located between the first device and the communication apparatus, to obtain the updated environment sensing information. For a process in which the communication apparatus senses the environment, refer to the foregoing description of the process in which the communication apparatus senses the environment. After obtaining the updated environment sensing information, the communication apparatus may determine, based on the first information of the first device and the updated environment sensing information, whether an obstacle exists between the first device and the communication apparatus. If an obstacle still exists, the communication apparatus may continue to sense the environment. If an obstacle no longer exists between the first device and the communication apparatus, the communication apparatus may allocate antenna panels 103 for communication to the first device. The communication apparatus may allocate one or more antenna panels 103 to the first device as first antenna panels 103, to communicate with the first device. If the communication apparatus needs to sense the first device, the communication apparatus may allocate antenna panels 103 used for sensing to the first device. The communication apparatus may allocate one or more antenna panels 103 as second antenna panels 103 to the first device.

Alternatively, if it is determined that an obstacle exists between the first device and the communication apparatus, but a reflector is further disposed between the first device and the communication apparatus, if the communication apparatus sends, to the reflector, a signal to be sent to the first device, the reflector may reflect the signal to the first device. In this way, the first device can also receive the signal from the communication apparatus. For example, the communication apparatus may be disposed in the base station in FIG. 5, and the first device is the terminal device 2 in FIG. 5. The base station and the terminal device 2 are blocked by an obstacle. However, an object 2 is disposed beside the obstacle. The object 2 is, for example, a mirror. The mirror may be used as the reflector. The communication apparatus sends a signal to the mirror, and the signal can reach the terminal device 2 through reflection by the mirror. Similarly, the terminal device 2 sends a signal to the mirror, and the signal can also reach the communication apparatus through reflection by the mirror. Therefore, although the communication apparatus and the first device are blocked by an obstruction, the communication apparatus and the first device can also communicate with each other through the reflector. In this way, communication coverage of the communication apparatus can be increased. In this case, if the communication apparatus needs to communicate with the first device, antenna panels 103 used for communication may be allocated to the first device. For example, the communication apparatus allocates one or more antenna panels 103 as first antenna panels. If the communication apparatus needs to sense the first device, the communication apparatus may also allocate antenna panels 103 used for sensing to the first device. For example, the communication apparatus allocates one or more antenna panels 103 as second antenna panels.

Figure 7A:
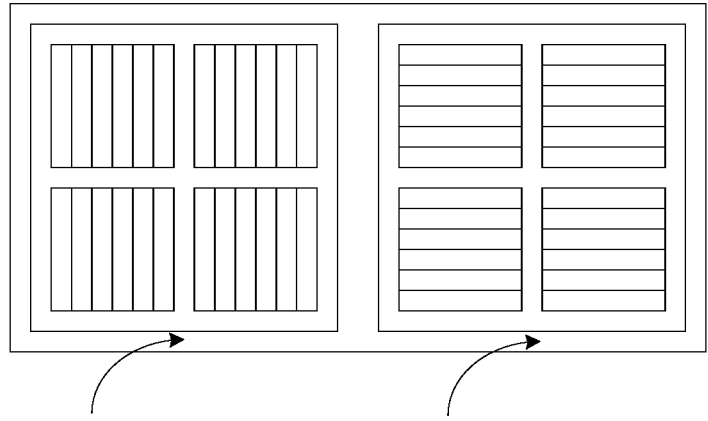
FIG. 7A and FIG. 7B are two schematic diagrams of allocating an antenna panel to a device by a communication apparatus according to an embodiment of this application.

In another example, the communication apparatus may determine, based on the first information of the first device and the environment sensing information, whether an obstacle exists between the first device and the communication apparatus. If it is determined that no obstacle exists between the first device and the communication apparatus and the communication apparatus needs to communicate with the first device, the communication apparatus may allocate, based on a distance between the first device and the communication apparatus, corresponding antenna panels 103 to the first device as first antenna panels. For example, the communication apparatus determines the distance between the first device and the communication apparatus based on the first information of the first device. If the distance is less than or equal to a first threshold, it indicates that the distance between the first device and the communication apparatus is short. In this case, the communication apparatus can implement communication with the first device by allocating only a small quantity of antenna panels 103 to the first device. For example, the communication apparatus allocates one or more antenna panels 103 as first antenna panels to the first device, and a quantity of antenna panels 103 included in the first antenna panel may be less than or equal to a second threshold. Similarly, if it is determined that no obstacle exists between the first device and the communication apparatus and the communication apparatus needs to sense the first device, the communication apparatus may allocate, based on the distance between the first device and the communication apparatus, corresponding antenna panels 103 to the first device as second antenna panels. For example, if the distance between the first device and the communication apparatus is less than or equal to the first threshold, the communication apparatus only needs to allocate a small quantity of antenna panels 103 to the first device, to implement awareness of the first device. For example, the communication apparatus allocates one or more antenna panels 103 as second antenna panels to the first device, and a quantity of antenna panels 103 included in the second antenna panel may be less than or equal to a fourth threshold. FIG. 7A is a schematic diagram of first antenna panels and second antenna panels that are allocated to the first device by the communication apparatus. Because the distance between the first device and the communication apparatus is short, the communication apparatus allocates a small quantity of antenna panels 103 to the first device. For example, the communication apparatus allocates, to the first device, four antenna panels 103 as first antenna panels and four antenna panels 103 as second antenna panels.

Because the distance between the first device and the communication apparatus is short, a wide beam synthesized by a small quantity of antenna panels 103 can implement coverage on the first device. It is not necessary to allocate excessive antenna panels 103 for either communication or sensing, and more antenna panels 103 can be reserved for allocation to other users, to implement appropriate use of the antenna panels 103. For example, the first threshold, the second threshold, and the fourth threshold may be determined by the communication apparatus, or may be preconfigured in the communication apparatus, or may be specified in a protocol. The second threshold and the fourth threshold may be equal or may be not equal.

Figure 7B:
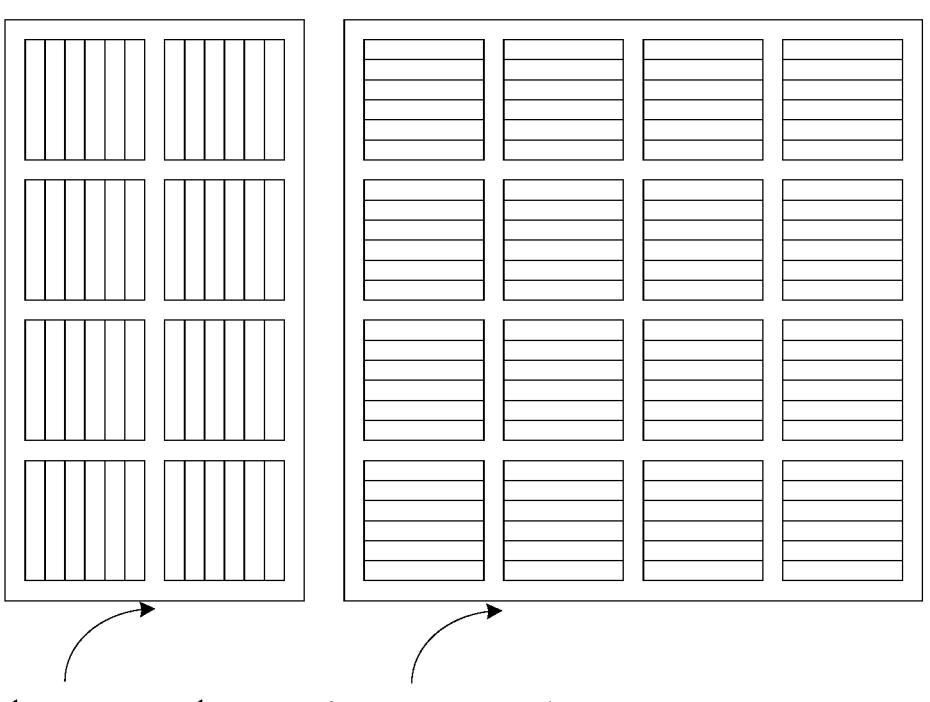

In still another example, when the communication apparatus allocates, based on a distance between the first device and the communication apparatus, corresponding antenna panels 103 as first antenna panels to the first device, if the communication apparatus determines that the distance between the first device and the communication apparatus is greater than the first threshold, it indicates that the distance between the first device and the communication apparatus is long. In this case, the communication apparatus needs to allocate a large quantity of antenna panels 103 to the first device for communication, a beam gain of a narrow beam synthesized by these antenna panels 103 is high, and a coverage distance can be increased, to implement coverage on the first device. For example, the communication apparatus allocates one or more antenna panels 103 as first antenna panels to the first device, and a quantity of antenna panels 103 included in the first antenna panel may be greater than the second threshold. Similarly, when the communication apparatus allocates, based on the distance between the first device and the communication apparatus, corresponding antenna panels 103 to the first device as second antenna panels, if the communication apparatus determines that the distance between the first device and the communication apparatus is greater than the first threshold, the communication apparatus also needs to allocate a large quantity of antenna panels 103 to the first device for sensing. For example, the communication apparatus allocates one or more antenna panels 103 as second antenna panels to the first device, and a quantity of antenna panels 103 included in the second antenna panel may be greater than the fourth threshold. FIG. 7B is a schematic diagram of first antenna panels and second antenna panels that are allocated to the first device by the communication apparatus. Because the distance between the first device and the communication apparatus is long, the communication apparatus allocates a large quantity of antenna panels 103 to the first device. For example, the communication apparatus allocates, to the first device, 16 antenna panels 103 as first antenna panels and eight antenna panels 103 as second antenna panels. Alternatively, FIG. 7B may also represent that the communication apparatus allocates antenna panels 103 to a plurality of devices. For example, in FIG. 7B, 16 antenna panels 103 on the right are allocated to the plurality of devices as first antenna panels, and eight antenna panels 103 on the left are allocated to the plurality of devices as second antenna panels. For example, the communication apparatus is disposed in the base station in the scenario shown in FIG. 5, and the base station can communicate with the plurality of devices. The communication apparatus may allocate antenna panels 103 to the plurality of devices. In FIG. 7A and FIG. 7B, a box with a horizontal line represents a first antenna panel, and a box with a vertical line represents a second antenna panel. This does not indicate that structures of the antenna panels 103 are different, but is only for better distinguishing between the first antenna panel and the second antenna panel. In addition, FIG. 7A has a box outside, and FIG. 7B does not have a box outside, which indicates that the first antenna panels and the second antenna panels in FIG. 7A are allocated to a same device, and these antenna panels shown in FIG. 7B may be allocated to one device or may be allocated to different devices.

Because the distance between the first device and the communication apparatus is long, a wide beam synthesized by a small quantity of antenna panels 103 may not cover the first device. Therefore, a large quantity of antenna panels 103 need to be allocated to the first device, so that coverage of the first device is implemented by using a narrow beam synthesized by a large quantity of antenna panels 103, to improve coverage of the communication apparatus.

A quantity of antenna panels 103 allocated to a device does not remain constant. For example, if no obstacle exists between the first device and the communication apparatus initially and the distance between the first device and the communication apparatus is short, the communication apparatus allocates a small quantity of antenna panels 103 to the first device as first antenna panels. After a period of time, the first device has moved to an area that is far away from the communication apparatus. The communication apparatus may reallocate first antenna panels to the communication apparatus. In this case, a large quantity of antenna panels 103 may be allocated to the communication apparatus as first antenna panels, or the communication apparatus may add at least one antenna panel 103 to the originally allocated first antenna panels. In other words, in embodiments of this application, the antenna panels 103 may be scheduled in real time as required, so that allocation of the antenna panels 103 better complies with a current scenario.

A driving scenario is used as an example. For example, the communication apparatus is disposed in a vehicle. The vehicle travels in a city. A traveling speed is low. A target object on which the vehicle focuses is close to the vehicle. In this case, the communication apparatus may allocate a small quantity of antenna panels 103 to the target object. These antenna panels 103 may generate a wide beam, to send the first-type sensing signal to the target object. In addition, these antenna panels 103 may also complete the communication function. For example, these antenna panels 103 may communicate with the base station to download a video, or these antenna panels may communicate with another device. In another example, the communication apparatus is disposed in a vehicle. The vehicle travels on a highway at a high traveling speed. The vehicle needs to focus on a target object at a long distance. The communication apparatus may allocate a large quantity of antenna panels 103 to the target object, and these antenna panels 103 may generate a narrow beam, to improve coverage of the communication apparatus. The communication apparatus may send the first-type sensing signal to the target object by using the antenna panels 103. After receiving the corresponding second-type sensing signal, the communication apparatus may obtain sensing information, and may feed back sensing information to a user of the vehicle, to provide reference for driving behavior.

In embodiments of this application, the communication apparatus may separately allocate antenna panels 103 to different devices. In this case, optionally, corresponding measures may be considered to reduce interference between the antenna panels 103 allocated to the different devices. For example, the communication apparatus further allocates a fifth antenna panel to a second device in the at least one device based on the at least one piece of first information and the environment sensing information. The fifth antenna panel may include one or more antenna panels 103. The fifth antenna panel may be used by the communication apparatus to communicate with the second device, and may be further used by the communication apparatus to send the first-type sensing signal to the second device. In this case, the communication apparatus may reduce interference between the first antenna panel and the fifth antenna panel by using a corresponding measure. For example, the first antenna panel and the fifth antenna panel may satisfy one or more of the following relationships: a communication time of the first antenna panel is different from that of the fifth antenna panel; the first antenna panel and the fifth antenna panel use different communication frequencies; and a distance between the first antenna panel and the fifth antenna panel is greater than a third threshold. If the communication time of the first antenna panel is different from that of the second antenna panel, it indicates that interference is reduced between the first antenna panel and the second antenna panel in a time division multiplexing manner. If the communication frequency of the first antenna panel is different from that of the second antenna panel, it indicates that interference is reduced between the first antenna panel and the second antenna panel in a frequency division multiplexing manner. If the distance between the first antenna panel and the second antenna panel is greater than the third threshold, it indicates that interference is reduced between the first antenna panel and the second antenna panel in a space division multiplexing manner. Certainly, in addition to the first antenna panel and the fifth antenna panel, interference may also exist between the second antenna panel and the fifth antenna panel. For a manner of reducing interference, refer to the foregoing manners. In addition, for example, the communication apparatus further allocates a sixth antenna panel to the second device in the at least one device based on the at least one piece of first information and the environment sensing information. The sixth antenna panel may include one or more antenna panels 103, and the sixth antenna panel may be used by the communication apparatus to receive the second-type sensing signal from the second device. Interference may also exist between the sixth antenna panel and the second antenna panel. For a manner of reducing interference, refer to the foregoing manners. Interference may also exist between the sixth antenna panel and the first antenna panel. For a manner of reducing interference, refer to the foregoing manners. Even, interference may also exist between the first antenna panel and the second antenna panel. For a manner of reducing interference, refer to the foregoing manners. In other words, interference may be generated between the two antenna panels 103 regardless of whether the antenna panels 103 are allocated to one device or the antenna panels 103 are allocated to a plurality of devices. In this case, the foregoing manner may be used to reduce interference, to improve communication quality.

Figure 8:
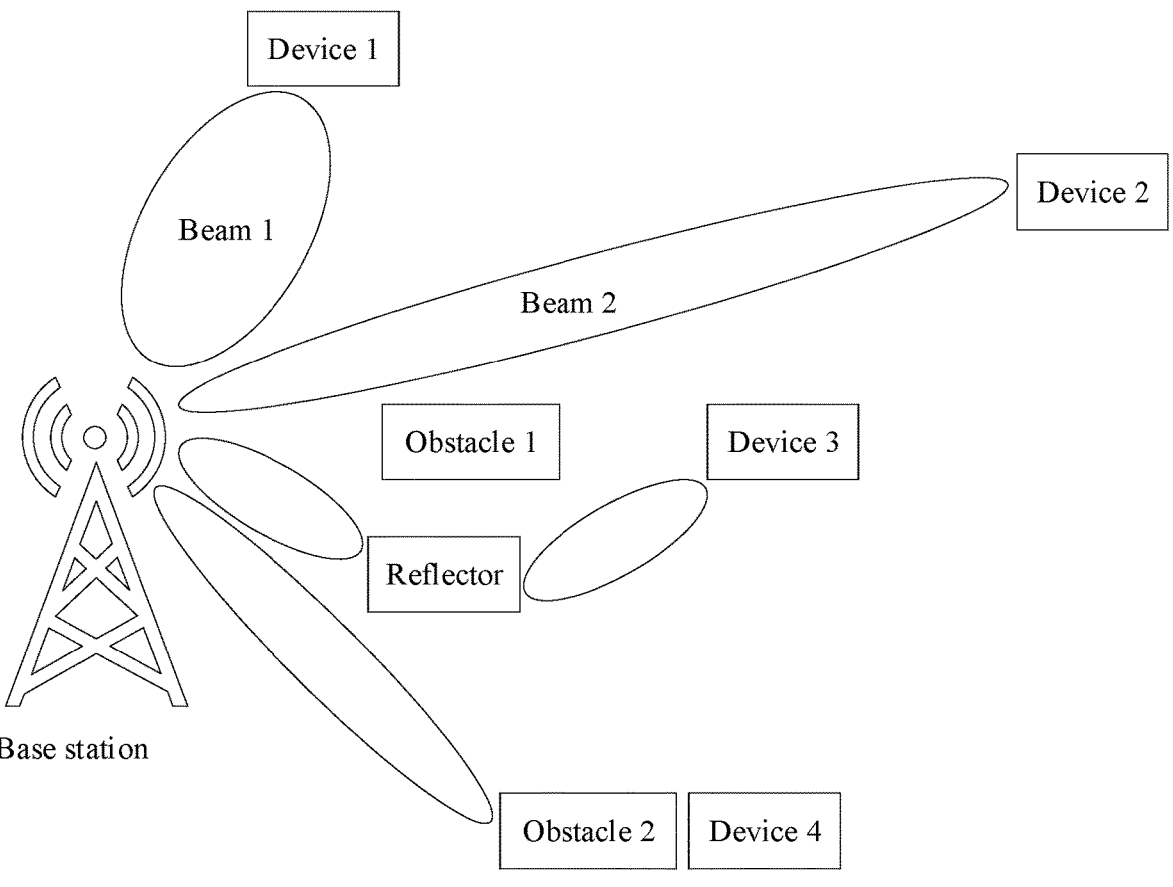
FIG. 8 is a schematic diagram of communicating, by a communication apparatus, with different devices by using allocated antenna panels according to an embodiment of this application.

For example, FIG. 8 is a schematic diagram in which the communication apparatus communicates with different devices by using allocated antenna panels 103. In FIG. 8, an example in which the communication apparatus is disposed in a base station is used. A device 1 is close to the communication apparatus, and no obstacle exists between the device 1 and the communication apparatus. The communication apparatus allocates a small quantity of antenna panels 103 to the device 1. The communication apparatus communicates with the device 1 by using a beam 1 synthesized by these antenna panels, and the beam 1 is a wide beam. A device 2 is far away from the communication apparatus, and no obstacle exists between the device 2 and the communication apparatus. The communication apparatus allocates a large quantity of antenna panels 103 to the device 1. The communication apparatus communicates with the device 2 by using a beam 2 synthesized by these antenna panels, and the beam 2 is a narrow beam. It can be learned that a coverage distance of a narrow beam is greater than a coverage distance of a wide beam. An obstacle 1 exists between a device 3 and the communication apparatus, and a reflector is disposed between the device 3 and the communication apparatus. In this case, the communication apparatus and the device 3 can communicate with each other through the reflector. An obstacle 2 exists between a device 4 and the communication apparatus, and no reflector is disposed between the device 4 and the communication apparatus. The communication apparatus cannot communicate with the device 4 temporarily. The communication apparatus may continue to sense the device 4 or sense an environment by using antenna panels 103, to determine whether the obstacle 2 still exists between the communication apparatus and the device 4. Alternatively, if the obstacle 2 is a fixed obstacle, for example, a building, and the communication apparatus and the device 4 are also in a stationary state, the communication apparatus may abandon communication with the device 4 and no longer sense the device 4. In this case, the communication apparatus may not need to allocate, to the device 4, antenna panels 103 used for communication, not need to allocate, to the device 4, antenna panels 103 used for sending a first-type sensing signal to the device 4, and not need to allocate, to the device 4, antenna panels 103 used for receiving a second-type sensing signal from the device 4. In other words, the communication apparatus does not allocate antenna panels 103 to the device 4.

As described above, the communication apparatus may allocate antenna panels 103 used for sensing to a corresponding device, and another object, for example, a building or a tree, other than the device exists in the environment. For example, the communication apparatus may determine, based on at least one piece of first information, which devices exist in the environment, and then determine, based on environment sensing information, which objects other than the devices exist in the environment. If the communication apparatus needs to detect these objects in the environment, the communication apparatus may also allocate corresponding antenna panels 103 to these objects. These antenna panels 103 may be configured to send first-type sensing signals to these objects, or may receive second-type sensing signals reflected by these objects. Optionally, interference between the antenna panels 103 allocated to these objects and between the antenna panels allocated to these objects and the antenna panels 103 allocated to the devices may also be reduced in the foregoing manner.

It can be learned that in embodiments of this application, an allocation manner of the antenna panels 103 can be dynamically scheduled based on an environmental condition, to implement compatibility between sensing and communication, and ensure appropriate resource utilization. In addition, interference between the antenna panels 103 can be reduced by taking corresponding measures, to improve communication quality.

S604: The communication apparatus sends a third signal to the first device by using the first antenna panel, and correspondingly, the first device receives the third signal from the communication apparatus.

If the communication apparatus allocates the first antenna panel to the first device, S604 may be performed. If the communication apparatus does not allocate the first antenna panel to the first device, S604 may not be performed. The third signal is, for example, a communication signal. In other words, after allocating the first antenna panel to the first device, the communication apparatus may communicate with the first device by using the first antenna panel. Optionally, after receiving the third signal, the first device may send a corresponding communication signal to the communication apparatus, or may not send a signal to the communication apparatus. If the first device sends a signal to the communication apparatus, the communication apparatus may also receive the signal by using the first antenna panel.

S605: The communication apparatus sends a fourth signal to the first device by using the first antenna panel, and correspondingly, the first device receives the fourth signal from the communication apparatus.

If the communication apparatus allocates the first antenna panel to the first device, S605 and S606 may be performed. If the communication apparatus does not allocate the first antenna panel to the first device, S605 and S606 may not be performed. The fourth signal is a first-type sensing signal. For an implementation of the first-type sensing signal, refer to the foregoing description. In this case, the third signal may be a communication signal, for example, a synchronization signal, or may be another communication signal. Alternatively, the third signal may be a signal dedicated to implementing a sensing function, for example, an FMCW signal. In other words, after the communication apparatus allocates the first antenna panel to the first device, if there is a sensing requirement for the first device, the communication apparatus may sense the first device by using the first antenna panel.

S606: The first device sends a fifth signal to the communication apparatus, and correspondingly, the communication apparatus receives the fifth signal from the first device by using the second antenna panel.

The fifth signal is a second-type sensing signal. If a mono-static sensing mode is used, the fifth signal may be a reflected signal of the fourth signal, that is, the fifth signal is a signal reflected by the first device after the fourth signal reaches the first device. If a bi-static sensing mode is used, the fifth signal may be a signal generated based on the fourth signal. For example, after the fourth signal is received by the first device, the first device generates a feedback signal of the fourth signal, and sends the feedback signal to the communication apparatus. The communication apparatus receives the feedback signal by using the second antenna panel, and the feedback signal is the fifth signal.

The communication apparatus may obtain sensing information based on the second-type signal. For a manner in which the communication apparatus obtains sensing information based on the fourth signal and the fifth signal, refer to the foregoing description.

S604 to S606 are optional steps, and are represented by dashed lines in FIG. 6.

In embodiments of this application, some antenna panels 103 of the communication apparatus may be used for communication, and some antenna panels 103 may be used for sensing, so that a communication function and a sensing function are implemented by using different antenna panels 103, to reduce mutual interference between different functions during execution. In addition, there is no need to arrange two hardware systems in the communication apparatus, and only one hardware system is required to implement the sensing and communication functions. In this way, a size of the communication apparatus is reduced, and costs of the communication apparatus are reduced.

Figure 9:
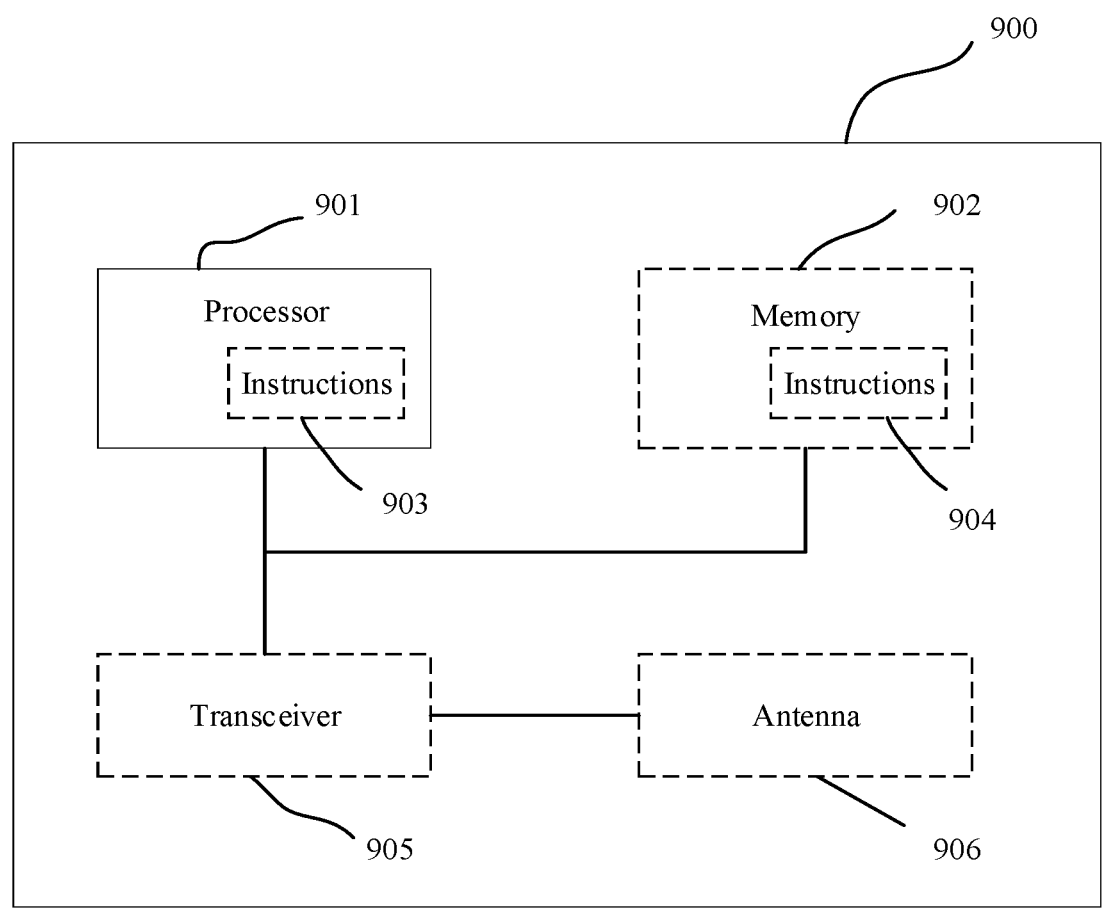
FIG. 9 is a schematic diagram of a structure of a communication apparatus according to an embodiment of this application.

FIG. 9 is a schematic diagram of a structure of a communication apparatus according to an embodiment of this application. A communication apparatus 900 may be the communication apparatus in the embodiment shown in FIG. 6 or a circuit system of the communication apparatus, and is configured to implement the method corresponding to the communication apparatus in the foregoing method embodiments. For a specific function of the communication apparatus 900, refer to the description in the foregoing method embodiments. For example, a circuit system is a chip system. The communication apparatus 900 and the communication apparatus shown in any one of FIG. 1, FIG. 3, or FIG. 4 may be a same communication apparatus, or the communication apparatus 900 is different from the communication apparatuses shown in FIG. 1, FIG. 3, and FIG. 4.

The communication apparatus 900 includes one or more processors 901. The processor 901 may also be referred to as a processing unit, and may implement a specific control function. The processor 901 may be a general-purpose processor, a dedicated processor, or the like. For example, the processor includes a baseband processor and a central processing unit. The baseband processor may be configured to process a communication protocol and communication data. The central processing unit may be configured to control the communication apparatus 900, execute a software program, and/or process data. Different processors may be independent components, or may be disposed in one or more processing circuits, for example, integrated into one or more application-specific integrated circuits. If the communication apparatus 900 and the communication apparatus shown in any one of FIG. 1, FIG. 3, or FIG. 4 are a same communication apparatus, the processor 901 may be implemented by using the processor 101.

Optionally, the communication apparatus 900 includes one or more memories 902, configured to store instructions 904. The instruction 904 may be run on the processor, so that the communication apparatus 900 performs the method described in the foregoing method embodiments. Optionally, the memory 902 may further store data. The processor and the memory may be separately disposed, or may be integrated together.

Optionally, the communication apparatus 900 may include instructions 903 (which may also be referred to as code or a program in some cases). The instructions 903 may be run on the processor, so that the communication apparatus 900 performs the method described in the foregoing embodiments. The processor 901 may store data.

Optionally, the communication apparatus 900 may further include a transceiver 905 and an antenna 906. The transceiver 905 may be referred to as a transceiver unit, a transceiver, a transceiver circuit, a transceiver, an input/output interface, or the like, and is configured to implement a transmission and reception function of the communication apparatus 900 by using the antenna 906. If the communication apparatus 900 and the communication apparatus shown in any one of FIG. 1, FIG. 3, or FIG. 4 are a same communication apparatus, the transceiver 905 may be implemented by using a communication circuit 102, or the transceiver 905 may be implemented by using the communication circuit 102, the A/D conversion circuit 105, and the D/A conversion circuit 104. If the communication apparatus 900 and the communication apparatus shown in any one of FIG. 1, FIG. 3, or FIG. 4 are a same communication apparatus, the antenna 906 may be implemented by using the K antenna panels 103

Optionally, the communication apparatus 900 may further include one or more of the following components: a wireless communication module, an audio module, an external memory interface, an internal memory, a universal serial bus (universal serial bus, USB) interface, a power management module, an antenna, a speaker, a microphone, an input/output module, a sensor module, a motor, a camera, a display, and the like. It may be understood that, in some embodiments, the communication apparatus 900 may include more or fewer components, or some components are integrated, or some components are split. These components may be implemented by hardware, software, or a combination of software and hardware.

The processor 901 and the transceiver 905 described in embodiments of this application may be implemented on an integrated circuit (integrated circuit, IC), an analog IC, a radio frequency integrated circuit (radio frequency integrated circuit, RFIC), a hybrid signal IC, an application-specific integrated circuit (application-specific integrated circuit, ASIC), a printed circuit board (printed circuit board, PCB), an electronic device, or the like. The communication apparatus described in this specification may be an independent device (for example, an independent integrated circuit or a mobile phone), or may be a part (for example, a module that may be embedded in another device) of a large device. For details, refer to the foregoing description of the communication apparatus. Details are not described herein again.

Several embodiments provided in this application, when being implemented in the form of a software function unit and sold or used as an independent product, may be stored in a computer-readable storage medium. The computer software product is stored in a storage medium, and includes several instructions for instructing a computer device (which may be a personal computer, a server, a network device, or the like) to perform all or some of the steps of the method described in embodiments of this application. The foregoing computer-readable storage medium may be any usable medium that can be accessed by a computer. The following provides an example but does not impose a limitation: The computer-readable medium may include a random access memory (random access memory, RAM), a read-only memory (read-only memory, ROM), or any other medium that can be used to carry or store expected program code in a form of instructions or a data structure and can be accessed by the computer.

The foregoing descriptions are merely specific implementations of this application, but are not intended to limit the scope of protection of embodiments of this application. Any variation or replacement readily figured out by a person skilled in the art within the technical scope disclosed in embodiments of this application shall fall within the scope of protection of embodiments of this application. Therefore, the scope of protection of embodiments of this application shall be subject to the scope of protection of the claims.

What is claimed is:

1. A method, comprising:
   communicating, by a communication apparatus using a first part of a plurality of antenna panels, with one or more devices to obtain first information of the one or more devices, wherein the first information comprises location information and/or motion information of the one or more devices;
   sensing, by the communication apparatus using a second part of the plurality of antenna panels, an environment to obtain environment sensing information, wherein the second part of the plurality of antenna panels includes at least one antenna panel that has no overlap antenna panel with the first part of the plurality of antenna panels and is used for receiving one or more sensing signals for sensing information, and the environment sensing information comprises at least part of location information or motion information of an object in the environment; and determining, by the communication apparatus for a first device of the one or more devices, a first antenna panel and/or a second antenna panel from the plurality of antenna panels based on the first information and the environment sensing information, wherein the first antenna panel is configured to communicate with the first device and/or configured to send a first sensing signal for sensing information to the first device, the second antenna panel is configured to receive a second sensing signal corresponding to the first sensing signal from the first device, and the first antenna panel and the second antenna panel are different antenna panels;

wherein the first part of the plurality of antenna panels and the first antenna panel belong to N antenna panels configured for communications, the second antenna panel belongs to M antenna panels configured for sensing information and having no overlap antenna panel with the N antenna panels, the second part of the plurality of antenna panels includes a third antenna panel belonging to the N antenna panels and at least one antenna panel belonging to the M antenna panels, the M and the N being a positive integer.

2. The method of claim 1, wherein the second part of the plurality of antenna panels comprises a third antenna panel and a fourth antenna panel, and the sensing the environment to obtain the environment sensing information comprises:

sending, by the communication apparatus through the third antenna panel, a first signal to the environment for obtaining the environment sensing information, wherein the third antenna panel belongs to the first part of the plurality of antenna panels;

receiving, by the communication apparatus via the fourth antenna panel, a sensing signal from the object in the environment, wherein the sensing signal is a reflected signal of the first signal, or the sensing signal is a signal generated based on the first signal, the fourth antenna panel belongs to the at least one antenna panel that has no overlap antenna panel with the first part of the plurality of antenna panels and is used for receiving the one or more sensing signals for obtaining the environment sensing information; and performing, by the communication apparatus using a processor, correlation processing based on the sensing signal, to obtain the environment sensing information.

3. The method of claim 1, the method further comprising:

determining, by the communication apparatus, a fifth antenna panel based on the first information and the environment sensing information, wherein the fifth antenna panel is configured to communicate with a second device of the one or more devices, and/or is configured to send a sensing signal to the second device for sensing information, and the first antenna panel and the fifth antenna panel satisfy one or more of the following relationships:

a communication time of the first antenna panel is different from that of the fifth antenna panel;

the first antenna panel and the fifth antenna panel use different communication frequencies; and a distance between the first antenna panel and the fifth antenna panel is greater than a third threshold.

4. The method of claim 1, wherein the determining, by the communication apparatus, the first antenna panel based on the first information and the environment sensing information comprises:

determining, by the communication apparatus based on the first information of the first device, that a distance between the first device and the communication apparatus is less than or equal to a first threshold;

determining, by the communication apparatus based on the first information of the first device and the environment sensing information, that no obstacle exists between the first device and the communication apparatus; and determining, by the communication apparatus, the first antenna panel such that the first antenna panel has a quantity of antenna panels less than or equal to a second threshold.

5. The method of claim 1, wherein the determining, by the communication apparatus, the first antenna panel based on the first information and the environment sensing information comprises:

determining, by the communication apparatus based on the first information of the first device, that a distance between the first device and the communication apparatus is greater than a first threshold;

determining, by the communication apparatus based on the first information of the first device and the environment sensing information, that no obstacle exists between the first device and the communication apparatus; and determining, by the communication apparatus, the first antenna panel such that the first antenna panel has a quantity of antenna panels greater than a second threshold.

6. The method of claim 1, wherein the determining, by the communication apparatus, the second antenna panel based on the first information and the environment sensing information comprises:

determining, by the communication apparatus based on the first information of the first device and the environment sensing information, that an obstacle exists between the first device and the communication apparatus; and determining, by the communication apparatus, the second antenna panel.

7. The method of claim 6, wherein the determining, by the communication apparatus, the first antenna panel based on the first information and the environment sensing information comprises:

sensing, by the communication apparatus by using the second antenna panel, the first device to obtain updated first information of the first device;

determining, by the communication apparatus based on the updated first information of the first device and the environment sensing information, that no obstacle exists between the first device and the communication apparatus; and determining, by the communication apparatus, the first antenna panel.

8. The method of claim 1, wherein the first sensing signal comprises a synchronization signal that is used for communications between the communication apparatus and the first device.

9. The method of claim 1, further comprising:

adjusting, by the communication apparatus, a size of the N antenna panels and/or the M antenna panels in accordance with at least part of the first information or the environment sensing information.

10. A communication apparatus, comprising:

a non-transitory memory storing program instructions; and a processor configured to execute the program instructions to cause the communication apparatus to:

communicate with one or more devices through a first part of a plurality of antenna panels to obtain first information of the one or more devices, wherein the first information comprises location information and/or motion information of the one or more devices;

sense an environment using a second part of the plurality of antenna panels to obtain environment sensing information of an environment, wherein the second part of the plurality of antenna panels includes at least one antenna panel that has no overlap antenna panel with the first part of the plurality of antenna panels and is used for receiving one or more sensing signals for sensing information, and the environment sensing information comprises at least part of location information or motion information of an object in the environment; and determine a first antenna panel and/or a second antenna panel for a first device of the one or more devices from the plurality of antenna panels based on the first information and the environment sensing information, wherein the first antenna panel is configured to communicate with the first device, and/or send a first sensing signal to the first device, the second antenna panel is configured to receive a second sensing signal corresponding to the first sensing signal from the first device, and the first antenna panel and the second antenna panel are different antenna panels;

wherein the first part of the plurality of antenna panels and the first antenna panel belong to N antenna panels configured for communications, the second antenna panel belongs to M antenna panels configured for sensing information and having no overlap antenna panel with the N antenna panels, the second part of the plurality of antenna panels includes a third antenna panel belonging to the N antenna panels and at least one antenna panel belonging to the M antenna panels, the M and the N being a positive integer.

11. The communication apparatus of claim 10, wherein the second part of the plurality of antenna panels comprises a third antenna panel and a fourth antenna panel, and the processor is configured to execute the program instructions to cause the communication apparatus to obtain the environment sensing information by:

sending a first signal for sensing information to the environment through the third antenna panel;

receiving a sensing signal from the object via the fourth antenna panel, wherein the sensing signal is a reflected signal of the first signal, or the sensing signal is a signal generated based on the first signal, the fourth antenna panel belongs to the at least one antenna panel that has no overlap antenna panel with the first part of the plurality of antenna panels and is used for receiving one or more sensing signals for obtaining the environment sensing information; and performing correlation processing based on the sensing signal, to obtain the environment sensing information.

12. The communication apparatus of claim 10, wherein the processor is configured to execute the program instructions to cause the communication apparatus to:

determine a fifth antenna panel of the plurality of antenna panels based on the first information and the environment sensing information, wherein the fifth antenna panel is configured to communicate with a second device of the one or more devices, and/or is configured to send a sensing signal to the second device for sensing information, and the first antenna panel and the fifth antenna panel satisfy one or more of the following relationships:

a communication time of the first antenna panel is different from that of the fifth antenna panel;

the first antenna panel and the fifth antenna panel use different communication frequencies; and a distance between the first antenna panel and the fifth antenna panel is greater than a third threshold.

13. The communication apparatus of claim 10, wherein the first antenna panel is determined based on the first information and the environment sensing information in the following manner:

determining, based on the first information of the first device, that a distance between the first device and the communication apparatus is less than or equal to a first threshold;

determining, based on the first information of the first device and the environment sensing information, that no obstacle exists between the first device and the communication apparatus; and determining the first antenna panel such that the first antenna panel has a quantity of antenna panels less than or equal to a second threshold.

14. The communication apparatus of claim 10, wherein the first antenna panel is determined based on the first information and the environment sensing information in the following manner:

determining, based on the first information of the first device, that a distance between the first device and the communication apparatus is greater than a first threshold;

determining, based on the first information of the first device and the environment sensing information, that no obstacle exists between the first device and the communication apparatus; and determining the first antenna panel such that the first antenna panel has a quantity of antenna panels greater than a second threshold.

15. The communication apparatus of claim 10, wherein the second antenna panel is determined based on the first information and the environment sensing information in the following manner:

determining, based on the first information of the first device and the environment sensing information, that an obstacle exists between the first device and the communication apparatus; and determining the second antenna panel.

16. The communication apparatus of claim 15, wherein the first antenna panel is determined based on the first information and the environment sensing information in the following manner:

sensing the first device by using the second antenna panel, to obtain updated first information of the first device;

determining, based on the updated first information of the first device and the environment sensing information, that no obstacle exists between the first device and the communication apparatus; and determining the first antenna panel.

17. The communication apparatus of claim 10, wherein the first sensing signal comprises a synchronization signal that is used for communications between the communication apparatus and the first device.

* * * * *